US011921493B2

(12) United States Patent
Jayaprakash et al.

(10) Patent No.: US 11,921,493 B2
(45) Date of Patent: *Mar. 5, 2024

(54) SYSTEMS AND METHODS FOR REAL-TIME MEASUREMENT AND CONTROL OF SPRAYED LIQUID COVERAGE ON PLANT SURFACES

(71) Applicant: AgZen Inc., Somerville, MA (US)

(72) Inventors: Vishnu Jayaprakash, Somerville, MA (US); Kripa Kiran Varanasi, Lexington, MA (US)

(73) Assignee: AgZen Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,989

(22) Filed: Mar. 8, 2023

(65) Prior Publication Data

US 2023/0367295 A1    Nov. 16, 2023

Related U.S. Application Data

(63) Continuation-in-part of application No. 17/982,866, filed on Nov. 8, 2022.
(Continued)

(51) Int. Cl.
*G05B 19/416* (2006.01)
*A01C 23/00* (2006.01)
(Continued)

(52) U.S. Cl.
CPC .......... *G05B 19/416* (2013.01); *A01C 23/007* (2013.01); *A01C 23/047* (2013.01);
(Continued)

(58) Field of Classification Search
None
See application file for complete search history.

(56) References Cited

U.S. PATENT DOCUMENTS 10,713,484 B2   7/2020   Polzounov et al.
10,812,776 B2   10/2020  Redden
(Continued)

FOREIGN PATENT DOCUMENTS

JP    2012208839 A  * 10/2012
KR    20220033717 A  *  3/2022
(Continued)

OTHER PUBLICATIONS

ReportLinker, Global Foliar Spray Market to Reach US$9.1 Billion by the Year 2027, 22 pages, (2021), retrieved online at: https://www.globenewswire.com/news-release/2021/07/21/2266635/0/en/Global-Foliar-Spray-Market-to-Reach-US-9-1-Billion-by-the-Year-2027.html.
(Continued)

*Primary Examiner* — Mohammad Ali
*Assistant Examiner* — David Earl Ogg
(74) *Attorney, Agent, or Firm* — Choate, Hall & Stewart LLP; William R. Haulbrook; Qing Hua Wang

(57) ABSTRACT

Presented herein are systems and methods for automatically determining liquid coverage on plant surfaces. More particularly, in certain embodiments, presented herein is a system for receiving an image depicting one or more plant surfaces, automatically identifying the plant surfaces in the image and distinguishing portions covered by liquid, and automatically determining a liquid coverage value. In some embodiments, the system determines changes to liquid spraying parameters to achieve desired liquid coverage values. In some embodiments, the system uses two cameras to cooperatively conduct background removal in images and determination of liquid coverage.

30 Claims, 29 Drawing Sheets

Related U.S. Application Data

(60) Provisional application No. 63/448,166, filed on Feb. 24, 2023, provisional application No. 63/342,034, filed on May 13, 2022.

(51) Int. Cl.
*A01C 23/04* (2006.01)
*A01M 7/00* (2006.01)
*B05B 12/08* (2006.01)
*G06T 7/194* (2017.01)
*G06V 20/10* (2022.01)

(52) U.S. Cl.
CPC ......... *A01M 7/0089* (2013.01); *B05B 12/084* (2013.01); *G06T 7/194* (2017.01); *G06V 20/188* (2022.01); *G05B 2219/45013* (2013.01); *G06T 2200/24* (2013.01); *G06T 2207/10016* (2013.01); *G06T 2207/10024* (2013.01); *G06T 2207/10048* (2013.01); *G06T 2207/30188* (2013.01)

(56) References Cited

U.S. PATENT DOCUMENTS

| | | | |
|---|---|---|---|
| 10,897,893 B2 | 1/2021 | Varanasi et al. | |
| 11,093,745 B2 | 8/2021 | Redden et al. | |
| 11,129,343 B2 | 9/2021 | Redden et al. | |
| 11,642,674 B2 | 5/2023 | Varanasi et al. | |
| 11,716,990 B2 | 8/2023 | Varanasi et al. | |
| 2018/0330166 A1* | 11/2018 | Redden | G06V 20/188 |
| 2019/0307121 A1 | 10/2019 | Varanasi et al. | |
| 2020/0240841 A1* | 7/2020 | McQuilkin | A61B 5/0075 |
| 2020/0320682 A1 | 10/2020 | Alexander et al. | |
| 2021/0393962 A1 | 12/2021 | Durand | |
| 2022/0007589 A1 | 1/2022 | Binney et al. | |
| 2022/0053689 A1 | 2/2022 | Brown et al. | |
| 2022/0117214 A1* | 4/2022 | Garner | A01C 23/04 |
| 2022/0212796 A1* | 7/2022 | Faers | B64D 1/18 |
| 2022/0232815 A1 | 7/2022 | Gutsmann et al. | |
| 2023/0135222 A1 | 5/2023 | Varanasi et al. | |

FOREIGN PATENT DOCUMENTS

| | | |
|---|---|---|
| WO | WO-2020/225429 A1 | 11/2020 |
| WO | WO-2020/239664 A1 | 12/2020 |

OTHER PUBLICATIONS

Tian, H. et al., Computer vision technology in agricultural automation—A review, Information Processing in Agriculture, 7:1-19 (2020).

International Search Report for PCT/US23/21982, filed May 12, 2023, 2 pages, (dated Aug. 11, 2023).

Written Opinion for PCT/US23/21982, filed May 12, 2023, 16 pages, (dated Aug. 11, 2023).

* cited by examiner

| VEGETABLE CROPS | | |
|---|---|---|
| Crop | Pest | Rate lbs/acre |
| Artichokes (all varieties) | Leaf spot<br>Powdery Mildew | 10-20 |
| Asparagus | Mites<br>Rust | 10-30 |
| Beans, Peas | Leaf Spot<br>Powdery Mildew<br>Red Spider Mite<br>Rust | 3-10 |

*5-60 gallons of water per acre*

Beans
*100% coverage*
Peas
*~35% coverage*
Same 50 gallons/acre, 4 lb/acre, but different coverage of products on leaves
FIG. 6C

| Treatment Label | Chem-istries | Sprayer speed (mph) | Pressure (psi) | Nozzle | Per nozzle flow rate (gpm) | Droplet size rating | Notes |
|---|---|---|---|---|---|---|---|
| 1 | Control | 2.6 | 50 | XR 8003 | 0.3 | F | Typical spray |
| 2 | Control + Adjuvant | 2.6 | 50 | XR 8003 | 0.3 | F | Replicate typical spray conditions w/ AgZen adjuvant |
| 3 | Control | 3.7 | 50 | XR 8003 | 0.3 | F | Examine less GPA, 42% faster |
| 4 | Control + Adjuvant | 3.7 | 50 | XR 8003 | 0.3 | F | Examine less GPA w/ AgZen adjuvant, 42% faster |

FIG. 11B

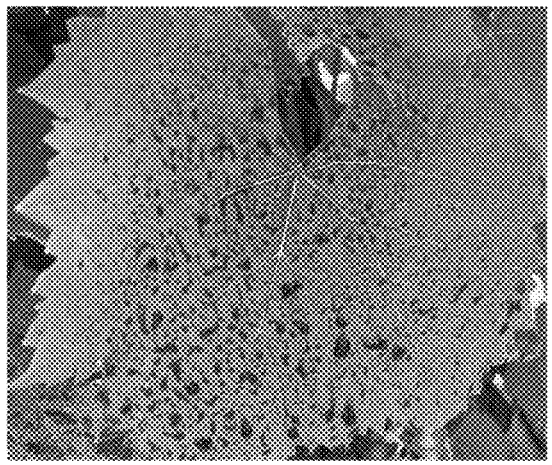
Water only – 18% coverage
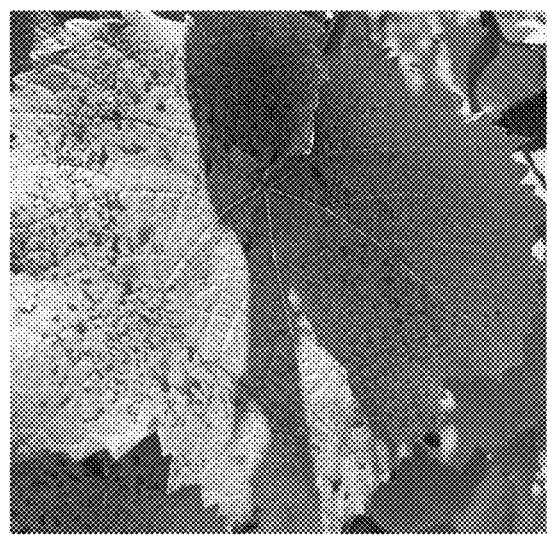
Other adjuvant – 4% coverage
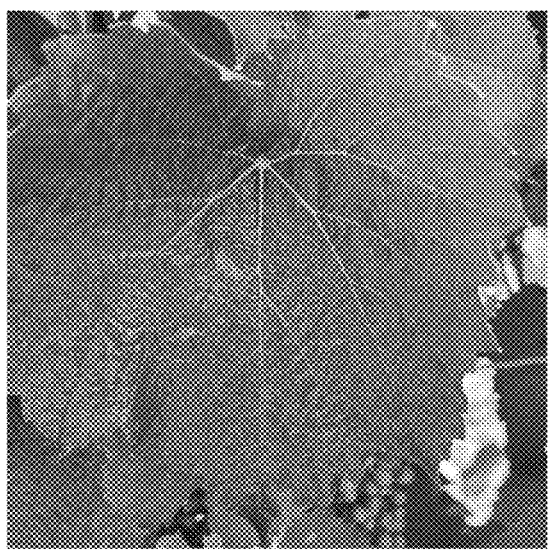
AgZen adjuvant – 68% coverage
FIG. 12

*Season-long feedback loop*

*Instant feedback loop supplements season-long feedback loop*

Exposure set too high, saturates image
Exposure brought lower, no change to display range
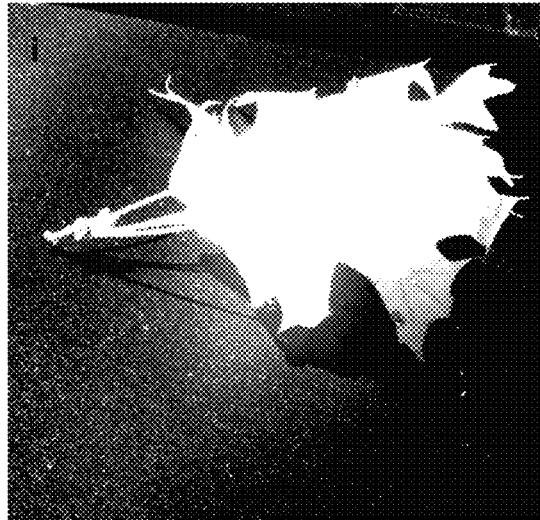
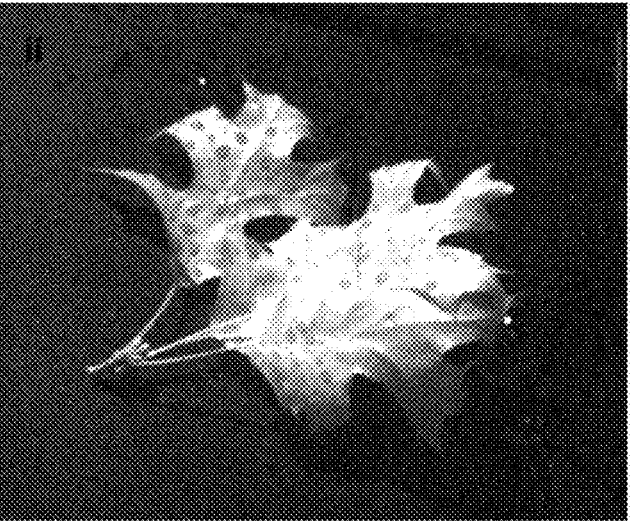
Exposure just starting to saturate, tight window of display mapping
Exposure brought lower, tight window of display range
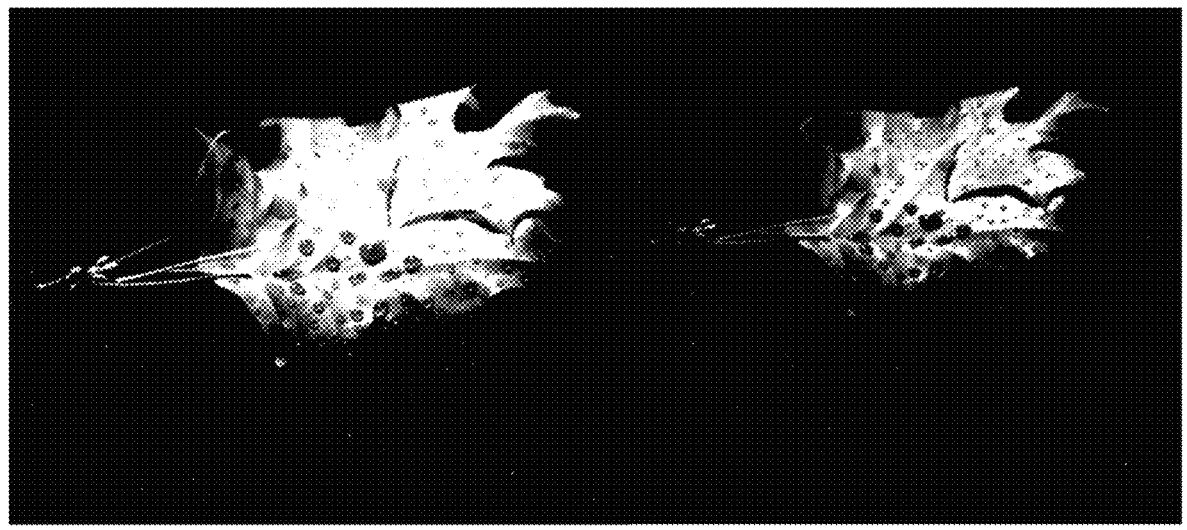
FIG. 14

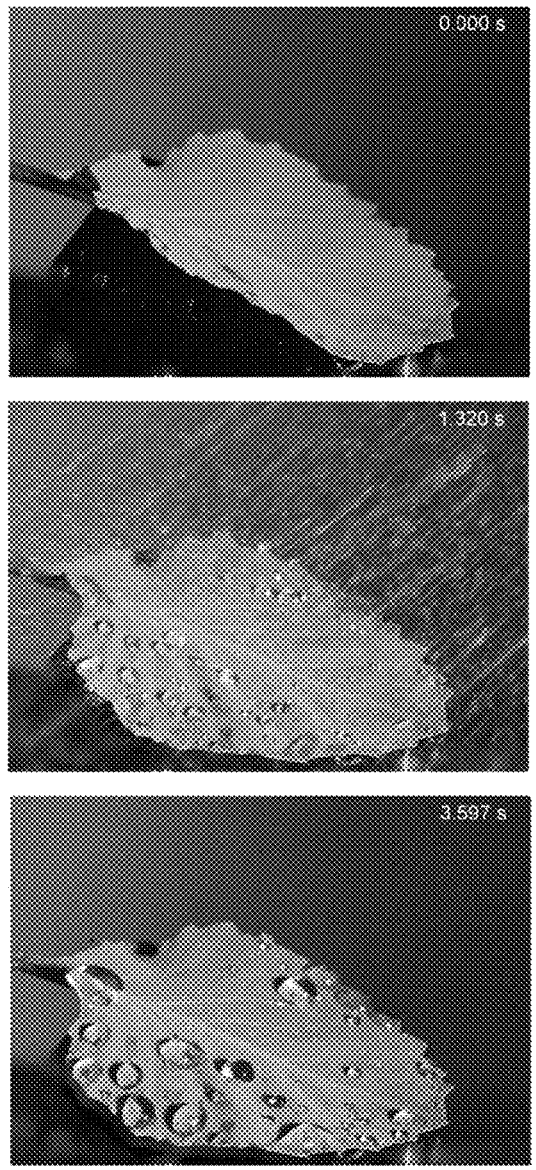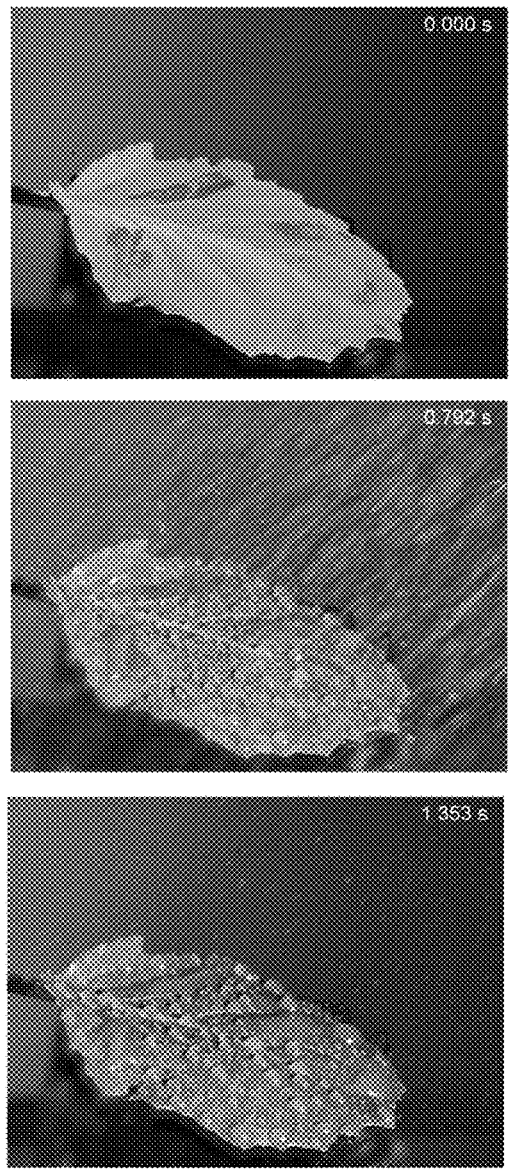
FIG. 16B                    FIG. 16C

SYSTEMS AND METHODS FOR REAL-TIME MEASUREMENT AND CONTROL OF SPRAYED LIQUID COVERAGE ON PLANT SURFACES

CROSS REFERENCE TO RELATED APPLICATIONS

This application claims benefit of U.S. Provisional Patent Application No. 63/342,034, filed May 13, 2022, and U.S. Provisional Patent Application No. 63/448,166, filed Feb. 24, 2023, and is a continuation-in-part of U.S. patent application Ser. No. 17/982,866, filed Nov. 8, 2022, the texts of which are incorporated herein by reference in their entireties.

FIELD

This invention relates generally to agricultural systems and methods. More particularly, in certain embodiments, the invention relates to systems and methods for real-time measurement and control of liquid coverage on plant surfaces.

BACKGROUND

Pesticide pollution is linked to acute illnesses such as cancer, neurological conditions, and birth defects. Furthermore, excess pesticides adversely affect soil chemistry and cause the death of non-target organisms, damaging soil microbiomes responsible for replenishing plant nutrients. Moreover, pesticides represent a major financial burden for farmers, for example, making up about 30% of the total production costs for crops such as cotton. Thus, it is important to improve the efficiency of pesticide application to reduce the amount of pesticide used while achieving efficacious pest control.

Agrochemicals such as pesticides, foliar fertilizer, and nutrient formulations are usually applied to plants in liquid solutions using pressure-controlled spray systems. Foliar solutions (foliar fertilizers) and pesticide solutions are applied directly to the surface of plants (e.g., a surface of a leaf, a surface of a root, a surface of a fruit, a surface of a vegetable, or a surface of a flower of the plant) as opposed to being put in the soil. In such agrochemical spray systems, pressurized pesticide solutions and/or foliar solutions are forced through nozzles at specific flow rates to achieve spray patterns that cover leaves or other plant surfaces with a significant number of droplets. For pesticide sprays to be efficacious in controlling pests and for foliar solutions to be efficacious as fertilizer, it is critical to achieve a high degree of liquid coverage (e.g., droplets, films, and/or pools of liquid) and liquid retention on target plant surfaces.

In order to maximize the efficiency of agrochemical sprays and achieve adequate liquid coverage, there are several parameters that operators can control and optimize. These parameters include the speed at which the sprayer moves through the field, the operational pressure of the spray system, the nozzle design (which impacts both the spray pattern and the droplet size distribution), the nozzle position relative to both the target plant surface and other nozzles, and the chemistry of the applied product. Each of these parameters can have a significant impact on spray characteristics, which can in turn influence pest outcomes and crop yield.

While spray applicators are tasked with carefully optimizing these interdependent parameters to achieve optimal pest control, there is a lack of technology that can estimate the effectiveness of a given spray application directly in real time. For example, farmers lack effective tools that can quantify liquid coverage on plant surfaces. Without such tools, farmers are forced to run season-long or year-long experiments to determine whether a certain set of parameters can lead to efficient pest control and the desired yield. The inability to monitor liquid coverage directly on crops also reduces the efficiency of spray applications under changing environmental and crop conditions. For example, a certain set of parameters that results in optimal liquid coverage when wind speeds are negligible could be much less efficient when on-field wind speeds increase to as little as 2-3 mph.

In addition to making pesticide and foliar fertilizer spraying more efficient, the ability to monitor liquid coverage directly on plants could have broader implications on pesticide and foliar fertilizer use in general. For example, currently, farms are advised to apply pesticides at a specific rate per acre as specified by the pesticide label. These rates are determined by field testing of pesticides under standard conditions in small acreage plots. However, a recommended application rate per acre does not account for variability in application efficiency on plants or the impact of variations in environmental and crop conditions on different fields. The ability to monitor coverage on leaves and other plant surfaces could allow farms to move away from application rates per acre and move towards more relevant metrics such as application rates for a given area of the target plant surface, e.g., the leaf area.

There is a need for spraying technology that improves agrochemical application efficiency and allows for more intelligent applicator system control to account for changing conditions in a wide variety of settings.

SUMMARY

Presented herein are systems and methods for automatically determining liquid coverage (e.g., droplets, films, and/or pools of liquid) on plant surfaces. More particularly, in certain embodiments, presented herein is a system for receiving an image depicting one or more plant surfaces, automatically identifying the plant surfaces in the image and distinguishing portions covered by liquid, and automatically determining a liquid coverage value. In some embodiments, the system uses two cameras to cooperatively conduct background removal in images and determination of liquid coverage.

In one aspect, the invention is directed to a system for automatically quantifying liquid coverage on plant surfaces, the system comprising: a processor of a computing device; and a memory having instructions stored thereon, wherein the instructions, when executed by the processor, cause the processor to: receive an image comprising a region of interest corresponding to one or more plant surfaces; automatically identify one or more portions of the region of interest corresponding to liquid; and automatically determine a liquid coverage value for the region of interest in the image, wherein the liquid coverage value quantifies an area of the plant surfaces depicted in the region of interest that is covered by liquid.

In certain embodiments, the liquid on the plant surfaces comprises a sprayed-on solution comprising one or more members selected from the group consisting of water, an adjuvant, an additive, a crop-compatible dye, an agrochemical solution, a liquid solution of a pesticide, a liquid solution of a fertilizer, and a foliar fertilizer.

In certain embodiments, the system further comprises one or more imaging devices and/or sensors for obtaining the image, wherein the one or more imaging devices and/or sensors comprises at least one member of the group consisting of a camera, a digital camera, a camera phone, a thermal imaging device, a night vision camera, a Light Detection and Ranging (LiDAR) device, an electronic image sensor, a charge-coupled device (CCD), an active-pixel sensor (CMOS sensor), a smart image sensor, an intelligent image sensor, and a short-wave infrared (SWIR) camera.

In certain embodiments, the liquid on the plant surfaces comprises a sprayed-on liquid, wherein the one or more imaging devices and/or sensors comprises a short-wave infrared (SWIR) camera, and wherein sufficient detectable contrast is achieved for accurate liquid coverage value determination without the need for any dyes to be added to the sprayed-on liquid.

In certain embodiments, the system further comprises a first camera for receiving a first image corresponding to a field of view comprising the one or more plant surfaces and a second camera for receiving a second image corresponding to the field of view of the first image, wherein the instructions, when executed by the processor, cause the processor to automatically identify a background mask from the first image, said background mask corresponding to non-plant-surface portions of the first image, to apply the background mask to the second image, thereby eliminating non-plant surface portions from the second image, and to automatically identify the liquid coverage value for the plant surfaces depicted in the background-eliminated second image.

In certain embodiments, the first camera is a red-green-blue (RGB) camera and the second camera is a shortwave infrared (SWIR) camera.

In certain embodiments, the system comprises an optical element (e.g., a hot mirror) that reflects infrared (IR) light and allows visible light to pass, said optical element positioned to allow alignment of fields of view of the first camera and the second camera.

In certain embodiments, the instructions, when executed by the processor, cause the processor to automatically determine a series of liquid coverage values for regions in a sequence of images in real time, as the sequence of images is obtained.

In certain embodiments, the system further comprises a display comprising a display screen and a graphical user interface (GUI) (e.g., said GUI presented via a mobile device application, e.g., a smart phone app), wherein the instructions cause the processor to graphically render the liquid coverage value for viewing by a person via the display.

In certain embodiments, the system further comprises a remote communications module (e.g., said remote communications module comprising one or more members selected from the group consisting of a wireless internet connection, a universal serial bus (USB) connection, and a Bluetooth connection), wherein the instructions cause the processor to communicate the liquid coverage value to a remote computing device (e.g., a device running farm management software, e.g., process control software) using the remote communications module.

In certain embodiments, the instructions, when executed by the processor, cause the processor to use the determined liquid coverage value to automatically determine an adjustment (e.g., a recommended adjustment) of one or more sprayer system parameters to achieve a desired level of liquid coverage, wherein the one or more sprayer system parameters comprises at least one member selected from the group consisting of a sprayer speed, a nozzle type, a nozzle positioning and/or orientation, a number of nozzles used, a spray pressure, an adjuvant and/or additive rate, an overall flow rate, a boom orientation and/or height, a spray solution composition, and a chemistry of one or more components of the spray solution.

In certain embodiments, the system comprises one or more environmental sensors for capturing environmental data corresponding to one or more environmental conditions at a location and at a time the image(s) is/are obtained, and wherein the instructions, when executed by the processor, cause the processor to use the environmental data along with the determined liquid coverage value or values to automatically determine the adjustment (e.g., a recommended adjustment) of the one or more sprayer system parameters, wherein the one or more environmental sensors comprises one or more sensors selected from the group consisting of a temperature sensor, a humidity sensor, a pressure sensor, a wind sensor, a light sensor, an air quality sensor, a gas sensor, a rainfall sensor, a radiation sensor, a soil sensor, and a sprayer speed sensor.

In certain embodiments, the instructions, when executed by the processor, cause the processor to automatically determine a series of liquid coverage values for regions of interest in a sequence of images and use the automatically determined values to automatically determine the adjustment of the one or more sprayer system parameters to achieve the desired level of liquid coverage, wherein the instructions cause the processor to automatically implement the determined adjustment(s) in real time via a control system for controlling the one or more sprayer system parameters, thereby operating the sprayer system in real time to improve liquid coverage by accounting for one or more changing conditions.

In certain embodiments, the instructions, when executed by the processor, cause the processor to automatically identify the liquid coverage value for the plant surfaces using (i) one or more pre-spray images corresponding to the field of view comprising the one or more plant surfaces prior to spraying with a liquid, and (ii) one or more post-spray images corresponding to the field of view comprising the one or more plant surfaces after spraying with the liquid.

In certain embodiments, the instructions, when executed by the processor, cause the processor to automatically identify the liquid coverage value for the plant surfaces using histograms computed for the one or more pre-spray images and the one or more post-spray images.

In another aspect, the invention is directed to a method for automatically quantifying liquid coverage on plant surfaces, the method comprising: receiving, by a processor of a computing device, an image comprising a region of interest corresponding to one or more plant surfaces; automatically identifying, by the processor, one or more portions of the region of interest corresponding to liquid; and automatically determining, by the processor, a liquid coverage value for the region of interest in the image, wherein the liquid coverage value quantifies an area of the plant surfaces depicted in the region of interest that is covered by liquid.

In certain embodiments, the liquid on the plant surfaces comprises a sprayed-on solution comprising one or more members selected from the group consisting of water, an adjuvant, an additive, a crop-compatible dye, an agrochemical solution, a liquid solution of a pesticide, a liquid solution of a fertilizer, and a foliar fertilizer.

In certain embodiments, the method further comprises obtaining the image using one or more imaging devices and/or sensors, wherein the one or more imaging devices and/or sensors comprises at least one member of the group consisting of a camera, a digital camera, a camera phone, a thermal imaging device, a night vision camera, a Light Detection and Ranging (LiDAR) device, an electronic image sensor, a charge-coupled device (CCD), an active-pixel sensor (CMOS sensor), a smart image sensor, an intelligent image sensor, and a short-wave infrared (SWIR) camera.

In certain embodiments, the liquid on the plant surfaces comprises a sprayed-on liquid, wherein the one or more imaging devices and/or sensors comprises a short-wave infrared (SWIR) camera, and wherein sufficient detectable contrast is achieved for accurate liquid coverage value determination without the need for any dyes to be added to the sprayed-on liquid.

In certain embodiments, the method comprises obtaining from a first camera a first image corresponding to a field of view comprising the one or more plant surfaces; obtaining from a second camera a second image corresponding to the field of view of the first image; automatically identifying, by the processor, a background mask from the first image, said background mask corresponding to non-plant-surface portions of the first image; applying the background mask to the second image, thereby eliminating non-plant surface portions from the second image; and automatically identifying, by the processor, the liquid coverage value for the plant surfaces depicted in the background-eliminated second image.

In certain embodiments, the first camera is a red-green-blue (RGB) camera and the second camera is a shortwave infrared (SWIR) camera.

In certain embodiments, obtaining the first and second images comprises using an optical element (e.g., a hot mirror) that reflects infrared (IR) light and allows visible light to pass, said optical element positioned to allow alignment of fields of view of the first camera and the second camera.

In certain embodiments, the method comprises automatically determining, by the processor, a series of liquid coverage values for regions in a sequence of images in real-time, as the sequence of images is obtained.

In certain embodiments, the method further comprises graphically rendering the liquid coverage value on a display for viewing by a person.

In certain embodiments, the method further comprises communicating, by the processor, the liquid coverage value to a remote computing device.

In certain embodiments, the method comprises automatically determining, by the processor, an adjustment (e.g., a recommended adjustment) of one or more sprayer system parameters to achieve a desired level of liquid coverage, using the determined liquid coverage value, wherein the one or more sprayer system parameters comprises at least one member selected from the group consisting of a sprayer speed, a nozzle type, a nozzle positioning and/or orientation, a number of nozzles used, a spray pressure, an adjuvant and/or additive rate, an overall flow rate, a boom orientation and/or height, a spray solution composition, and a chemistry of one or more components of the spray solution.

In certain embodiments, the method comprises capturing environmental data corresponding to one or more environmental conditions at a location and at a time the image(s) is/are obtained using one or more environmental sensors, and automatically determining, by the processor, the adjustment (e.g., a recommended adjustment) of the one or more sprayer system parameters using the environmental data along with the determined liquid coverage value or values, wherein the one or more environmental sensors comprise one or more sensors selected from the group consisting of a temperature sensor, a humidity sensor, a pressure sensor, a wind sensor, a light sensor, an air quality sensor, a gas sensor, a rainfall sensor, a radiation sensor, a soil sensor, and a sprayer speed sensor.

In certain embodiments, the method comprises automatically determining, by the processor, a series of liquid coverage values for regions of interest in a sequence of images and using the automatically determined liquid coverage values to automatically determine the adjustment of the one or more sprayer system parameters to achieve the desired level of liquid coverage, and automatically implementing the determined adjustment(s) in real time via a control system for controlling the one or more sprayer system parameters, thereby operating the sprayer system in real time to improve liquid coverage by accounting for one or more changing conditions.

In certain embodiments, the method comprises automatically identifying, by the processor, the liquid coverage value for the plant surfaces using (i) one or more pre-spray images corresponding to the field of view comprising the one or more plant surfaces prior to spraying with a liquid, and (ii) one or more post-spray images corresponding to the field of view comprising the one or more plant surfaces after spraying with the liquid.

In certain embodiments, the method comprises automatically identifying, by the processor, the liquid coverage value for the plant surfaces using histograms computed for the one or more pre-spray images and the one or more post-spray images.

In certain embodiments, features recited with respect to one aspect of the invention may be applied as features of another aspect of the invention.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 6C are photographs of the leaves of beans and peas with very different coverage levels for the same dosage of spray of a commercial product.

FIG. 10 is a table of different treatments and associated parameters, according to an illustrative embodiment.

FIG. 11B is a plot of mean area under disease progress curve (AUDPC) for fungicide applied with different spray droplet sizes, according to an illustrative embodiment.

FIG. 12 are photographs of examples of leaves sprayed with water only (top), with an aqueous solution of a commercial adjuvant (middle), and an aqueous solution of an improved adjuvant (bottom), with different surface coverage levels as identified via automated image analysis according to an illustrative embodiment.

FIG. 14 are photographs of a leaf with droplets taken at different camera exposure levels and intensity display ranges, according to an illustrative embodiment.

FIG. 16B is a series of screenshots from a video of a leaf sprayed with an aqueous solution of a conventional adjuvant, showing formation of large droplets and incomplete coverage, according to an illustrative embodiment.

FIG. 16C is a series of screenshots from a video of a leaf sprayed with an aqueous solution of an improved adjuvant, showing formation of smaller droplets with higher overall coverage, according to an illustrative embodiment.

FIG. 17 is a schematic diagram of an example implementation of a spraying system with two cameras, an onboard computer, a display system for communicating results, a spray controller unit, and an optional dye injection unit, according to an illustrative embodiment.

FIG. 18 is an example of a method of obtaining images from two cameras, processing images, and handling the image data, according to an illustrative embodiment.

FIG. 19 is a plot of an example histogram of a property of an image calculated across all pixels of an image, and a range of the pixels used for calculation and/or image processing, according to an illustrative embodiment.

FIG. 20 is a schematic diagram illustrating a liquid coverage measurement algorithm using pre-spray and post-spray cameras, according to an illustrative embodiment.

FIG. 21 is a schematic diagram illustrating a liquid coverage model where pixel values post-spray and pre-spray are displayed as separate histograms, according to an illustrative embodiment.

FIG. 22 is a schematic diagram illustrating a two-camera imaging system implementation, including two cameras (e.g., an RGB camera and a SWIR camera), a mirror, and a light source, according to an illustrative embodiment.

FIG. 23A is a plot of pixel histograms from multiple pre-spray (solid lines) and post-spray (dashed lines) images, according to an illustrative embodiment.

FIG. 23B is a plot of pixel histograms from an average of pre-spray (solid line) and post-spray (dashed line), while the inset is a plot of the difference between pre-spray and post-spray histograms, according to an illustrative embodiment.

FIG. 24 is a schematic diagram illustrating a two-camera imaging system implementation, including a mirror, a light source, camera adjustment, external enclosure box, and cooling fan, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication is not an admission that the publication serves as prior art with respect to any of the claims presented herein. The Background section may include concepts informed by the embodiments recited in the claims and further described elsewhere in the specification. The discussion of concepts in the Background section is not an admission that the subject matter discussed is prior art.

Documents are incorporated herein by reference as noted. Where there is any discrepancy in the meaning of a particular term, the meaning provided in this document is controlling.

Headers are provided for the convenience of the reader—the presence and/or placement of a header is not intended to limit the scope of the subject matter described herein.

Presented herein is a system to measure and control liquid coverage of a solution sprayed onto plant surfaces. In certain embodiments, the measurement system comprises: (i) a sensor or group of sensors which can be optical or non-optical, that can capture the state of the target environment; (ii) an algorithm or group of algorithms that can process the data captured by the sensors and compute droplet coverage on plant surfaces or other target area in terms of absolute or relative surface area, e.g., number of droplets or total liquid volume for a given region of interest; and, optionally, (iii) an injection system that can infuse an additive that can act as a marker and aid the sensor in capturing droplet coverage information. In certain embodiments, a marker additive is not infused into a solution via an injection system, but, rather, is mixed or otherwise combined into a bulk tank containing the solution to be sprayed.

In certain embodiments, the system processes the measured liquid coverage (e.g., in real-time, e.g., near real-time) and controls one or more sprayer parameters such as sprayer speed, nozzle type, nozzle positioning and/or orientation (e.g., in relation to each other), number of nozzles used, spray pressure, adjuvant/additive rate, overall flow rate, spray solution composition, the chemistry of one or more components of the spray solution, and/or other spray parameters in order to achieve a desired level of coverage. In certain embodiments, adjustments to the one or more sprayer parameters are made in real time (e.g., near real-time), as liquid coverage is measured. In certain embodiments, adjustments to the one or more sprayer parameters are made at some point in time following measurement of the liquid coverage (e.g., one or more hours, one or more days, or one or more weeks following measurement).

In certain embodiments, a sprayer is retrofitted with an electronic injection system that infuses a crop compatible dye into the sprayed liquid. In certain embodiments, the sensor is a camera, e.g., a camera on a smart mobile phone, and an algorithm applies color thresholding, edge detection, and filtering to an image captured by the camera in order to compute a total area (e.g., area of leaf surface area) covered by liquid in a selected region of interest for a given set of spray parameters.

FIG. 1 is a schematic diagram illustrating a system 100 for measuring liquid coverage on a plant surface (e.g., leaf), according to an illustrative embodiment. In this embodiment, the system includes an agricultural liquid sprayer system 110 which may include any of the following components: nozzle(s), pump(s), tank(s), agitation system, flow-control assembly, pressure gauge(s), and/or distribution system. The liquid sprayer system may include a sprayer equipped (e.g., retrofitted) with an electronic injection system capable of infusing a crop-compatible dye into the liquid to be sprayed onto the plants, the dye permitting enhanced viewing of the liquid on the plant surface. The agricultural sprayer system may also have a control system for controlling various sprayer system parameters, such as sprayer speed, nozzle type, nozzle positioning and/or orientation (e.g., in relation to each other), number of nozzles used, spray pressure, adjuvant/additive rate, overall flow rate, spray solution composition, the chemistry of one or more components of the spray solution, and/or other spray parameters, for example. The control system may receive as input a value of droplet coverage of the imaged plant surface, as indicated in FIG. 1.

System 100 also includes one or more imaging devices and/or imaging sensors (optical or non-optical) 120 for obtaining images of a plant or plants (e.g., from a crop) whose droplet coverage is to be determined following spraying via the spraying system 110. The imaging device(s) and/or imaging sensor(s) 120 may include, for example, a camera, a digital camera, a camera phone, a thermal imaging device, a night vision camera, a Light Detection and Ranging (LiDAR) device, an electronic image sensor (e.g., a charge-coupled device (CCD), an active-pixel sensor (CMOS sensor)), a smart image sensor, an intelligent image sensor, and/or a shortwave infrared (SWIR) camera. A visible light camera may be used in conjunction with a colored light source (e.g., monochromatic) and/or a spray solution that contains a crop-compatible dye, so that visible changes may be more easily captured and automatically detected.

SWIR is light with wavelengths longer than near-infrared (NIR) but shorter than mid-wave IR (MWIR). SWIR detectors may be sensitive to wavelengths between about 0.9-1.7 μm, or between about 0.7-2.5 μm, or up to about 3 μm. SWIR light is not visible to the human eye, but reflects from objects in similar ways as visible wavelengths of light. A SWIR camera captures images using light in the SWIR range. SWIR cameras are particularly useful for imaging and detection of water because the water molecule has vibrational frequencies that absorb in the SWIR range such that water appears dark or nearly black in SWIR images. Therefore, for monitoring aqueous solutions sprayed on surfaces of plants, it is found that SWIR cameras allow the solution to be directly imaged without the need for any dyes to be added to the solutions.

While the illustrative image in FIG. 1 shows only a single leaf, in other embodiments, a plurality of leaves or other plant surfaces, e.g., in an image of a crop region, is analyzed to determine a value of droplet coverage. In certain embodiments, a sequence of images (e.g., video images) are obtained from which droplet coverage is determined, for real time (e.g., near real-time) computation of droplet coverage. In certain embodiments, the one or more imaging devices and/or imaging sensors are arranged to capture the state of the target surface(s) both before and after spraying. For example, a spray boom may be fitted with multiple cameras, one in front of the boom and one behind the boom so that a picture without droplets is captured, and then as the sprayer moves through, a picture with droplets is captured. In certain embodiments, the system 100 further includes one or more environmental sensors for capturing environmental data (e.g., wind, temperature, humidity, barometric pressure, light levels, location, air quality, radiation, rainfall, soil condition, and the like).

Figure 1:
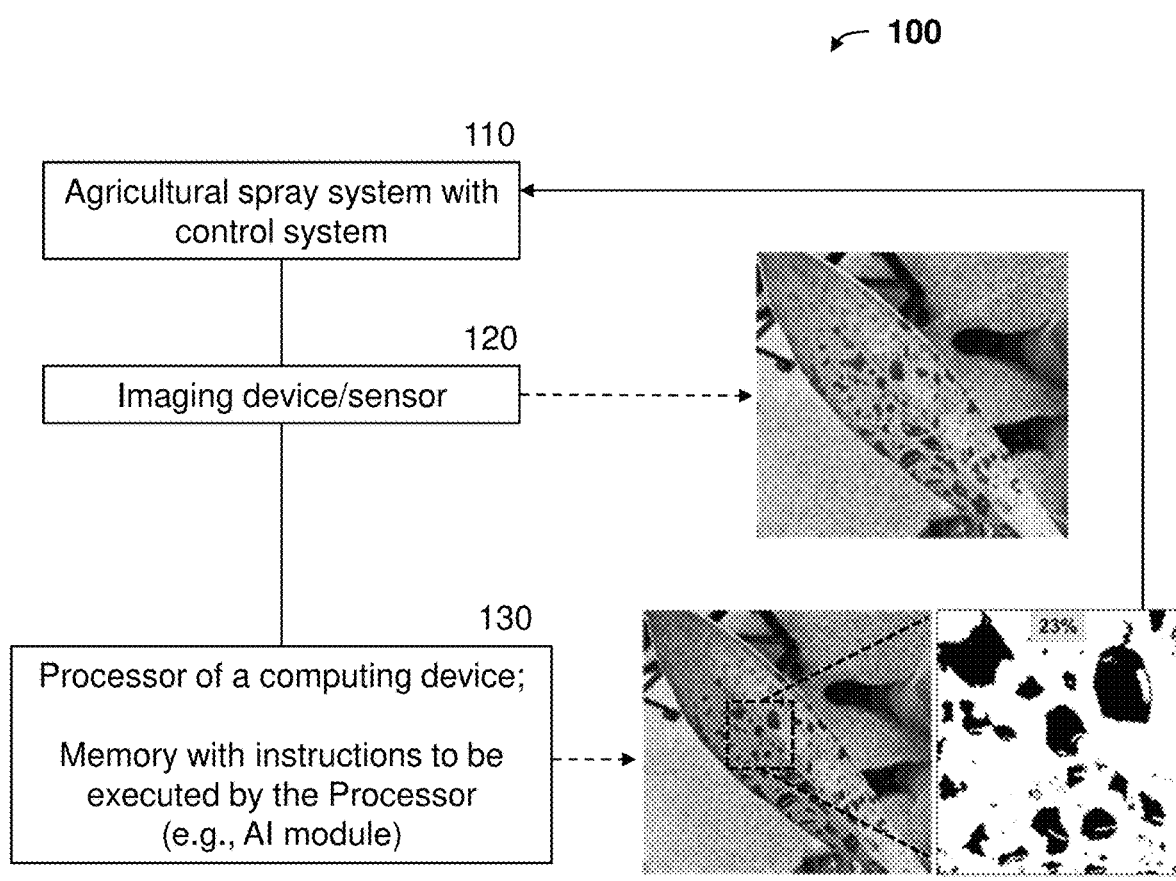
FIG. 1 is a schematic diagram illustrating a system for measuring liquid coverage on plant surfaces, according to an illustrative embodiment.

System 100 also includes a computer processor 130 with an artificial intelligence (AI) (e.g., machine learning) module or other algorithm-executing module. Examples of components of this system are presented herein, for example, under the header "Software, Computer System, and Network Environment" which describe FIGS. 4 and 5. In one example, the algorithm-executing module of the processor 130 applies one or more of: color thresholding, edge detection, filtering, deep learning, neural networks, convolutions, depth estimation, active learning, transfer learning, and/or other image analysis/segmentation techniques, to identify and/or distinguish between a droplet area and a non-droplet area of the plant (e.g., leaf) surface in a region of the image. The module then computes a droplet coverage value that quantifies the droplet area in relation to the total plant surface (e.g., leaf surface) area. Where a sequence of images are obtained (e.g., in real time), droplet coverage values may be computed for a plurality of the images (e.g., to determine change in droplet coverage, e.g., in real time). Based on the determined droplet coverage value, one or more parameters of the agricultural sprayer system 110 may be adjusted (e.g., either automatically or manually), e.g., sprayer speed, nozzle type, nozzle positioning and/or orientation (e.g., in relation to each other), number of nozzles used, spray pressure, adjuvant/additive rate, overall flow rate, spray solution composition, the chemistry of one or more components of the spray solution, and/or other spray parameters, in order to improve or achieve a desired droplet coverage area. In certain embodiments, a recommendation is made by the system 100 for the adjustment, which may then be made by a human operator. In certain embodiments, the adjustment is automatically executed by the system 100. In certain embodiments, a recommendation is made by the system 100 for the adjustment, then, upon approval by a human operator, the adjustment is executed by the system 100. Where a sequence of images are obtained and analyzed, there may be a feedback loop as shown in FIG. 1, where sprayer system components are adjusted as droplet coverage area are determined or updated based on the updated images following updated spraying conditions.

Constructive Examples 1-4, presented below, describe how measured droplet coverage feedback may be applied, in certain illustrative embodiments.

Example 1: If measured liquid coverage is higher than a threshold level required for optimal pest control, a recommendation can be made to drive the sprayer faster, allowing applicators to cover more acres in less time and reducing the usage of sprayed pesticide.

Example 2: If measured liquid coverage is too low and measured wind is high, a recommendation could be made to switch to a nozzle that generates larger droplets to combat the effects of pesticide drift or to lower the boom height to reduce the travel time of the droplet in the air.

Example 3: If measured liquid coverage is too low for a given tank mix, recommendations can be made to add an adjuvant or wetting agent to aid in droplet adhesion and retention or to switch pesticide chemistries that provide better coverage and pest control.

Example 4: If measured liquid coverage is high on the top of the canopy but lower than desired in the middle or the bottom of the canopy, the use of air assisted spraying, drop nozzles, or finer droplets could be recommended.

The agricultural sprayer system 110 may use a liquid intended to simulate an agricultural solution (e.g., pesticide and/or fertilizer solution) to be sprayed on plants, or the sprayer system 110 may use the agricultural solution itself. In some examples, the sprayer system 110 uses liquid with a crop-compatible dye for enhanced imaging and determination of optimum or desired spray system variables, then, once the variables are determined, the agrochemicals (without the dye) are sprayed onto crops according to the determined spray system variables.

In certain embodiments, the agricultural solution is a solution comprising one or more pesticides such as herbicides (to control weeds and other plants), insecticides (to control insects), fungicides (to control fungi or other pathogens), nematicides (to control parasitic worms), rodenticides (to control rodents, for example), and anti-microbial products. In certain embodiments, the agricultural solution is a solution comprising one or more foliar fertilizers. Foliar fertilizers include, for example, phosphorus, zinc, and/or iron-containing materials, which are absorbed well by plant surfaces. Certain foliar fertilizers are provided as concentrated solutions in which nitrogen (N), phosphorus (P), and potassium (K) are combined in a desired ratio. In certain embodiments, the liquid solution being sprayed comprises a commercial dye used as vegetation markers. In certain embodiments, the liquid solution comprises one or more OMRI (Organic Materials Review Institute)-recognized and/or USDA (United States Department of Agriculture)-recognized organic formulations.

It is presently found that agrochemical solution application rates per acre do not inform critical spray parameters such as speed, pressure, drop size, adjuvants, and the like. By measuring droplet coverage directly on leaves, an improved result is obtained, resulting in more efficient use of the agrochemical and less waste and/or pollution. In some examples, the system includes a sprayer retrofit, a control system, and use of crop compatible dye. A cell phone/mounted camera and algorithms, either on the phone or in the cloud, (e.g., executed via an app) can be used for droplet coverage value determination. It is possible to quantify, evaluate, and optimize sprayer speed, nozzles and position, spray pressure, air pressure, spray adjuvants, flow rates, and the like. It is also possible to account for environmental conditions such as the wind, temperature, humidity, canopy, leaf, tree density variability, and the like, when determining optimum spray system parameters. The system provides coverage value over time, permitting collection of aggregated coverage data and determination of recommendations of spray system variables, spray scheduling, and the like, under various conditions.

Advantages and Improvements Over Existing Technology

There are a few technologies on the market that exist to help farmers estimate coverage, but none of them are able to serve as reliable and practical tools to accurately measure droplet coverage on plant surfaces.

Liquid Sensitive Paper

Figure 2A:
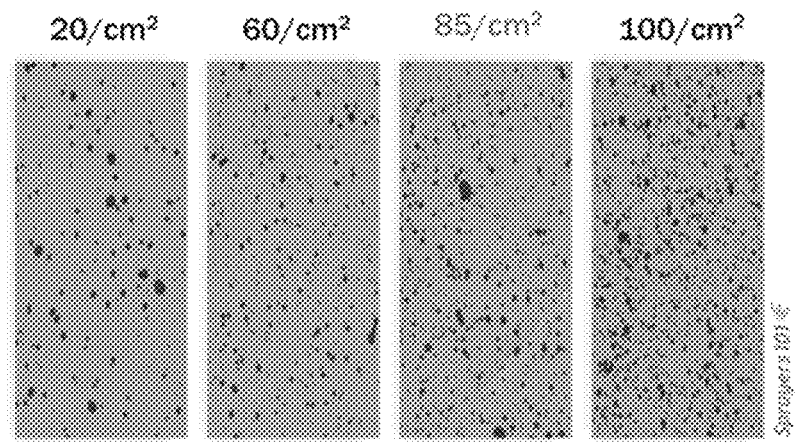
FIGS. 2A and 2B, are photographic depictions of water sensitive papers (WSPs) used for assessing spray quality and their relation to spray quality of plant surfaces.

Water and oil sensitive papers (WSPs/OSPs) are the most commonly used tools to help spray applicators assess the quality of their sprays. These papers are coated with materials that change color when exposed to water or oil. Since most pesticide sprays are water-based, WSPs are generally used to assess the quality of pesticide solution sprays. FIG. 2A depicts WSPs exposed to four different spray patterns resulting in a variation in the number of droplets detected per square centimeter. During use, WSPs are typically stuck onto or suspended on different parts of the target plant to assess how spray quality varies as the sprayer moves through a region of interest.

Figure 2B:
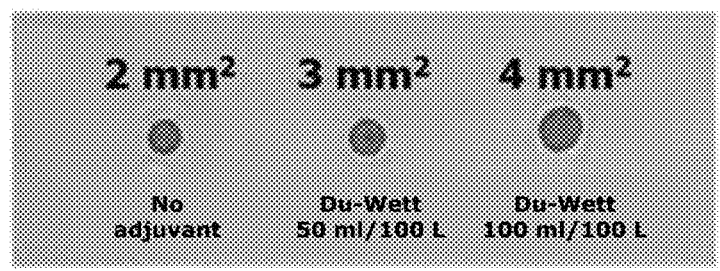
Figure 2C:
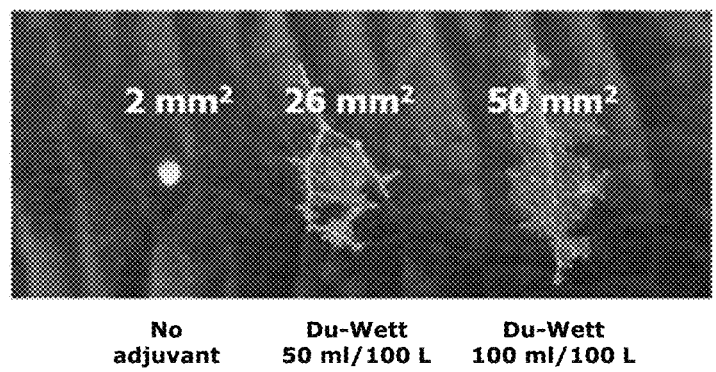
FIG. 2C is a photograph of a leaf surface with droplets that have spread out across the leaf surface differently than on WSP.
Figure 3:
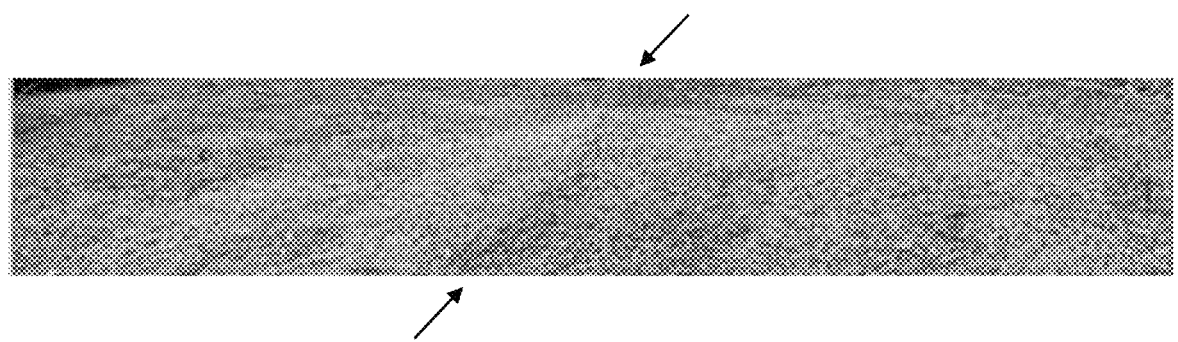
FIG. 3 is a photographic depiction of the use of turf dye on a grass field to indicate spray coverage.

While WSPs can accurately assess whether a certain number of droplets reached an area of interest, they are limited in their ability to assess coverage on plant surfaces. Water sensitive papers are hydrophilic whereas most plant surfaces, especially leaves, exhibit hydrophobic behavior. Thus, droplets that rebound or roll off of a hydrophobic plant surface would be mistakenly counted in estimating coverage when WSPs are used. In addition, since the surface properties of WSPs vary greatly from those of plants, WSPs cannot accurately capture the effects of spreading agents and other adjuvants that are designed to increase the contact area of spray droplets on plants. For example, FIG. 2B shows a detected coverage area on a WSP of droplets of a solution containing different concentrations of a spreading agent. By contrast, FIG. 2C shows the corresponding coverage area of the same solutions achieved on a leaf surface, illustrating the inability of WSPs to accurately capture the effect of adjuvants.

UV Dyes, Kaolin Clay and Crop-Compatible Dyes

In an attempt to overcome the limitations of WSPs mentioned above, spray applicators have explored using spray markers that would allow operators to measure coverage directly on plant surfaces. UV sensitive dyes that fluoresce when exposed to UV light have been used to measure spray coverage. The disadvantage with such dyes is that their fluorescence is only detectable in low ambient light conditions. As such, operators either need to use these dyes at night or take sprayed leaves into a laboratory in order to quantify coverage, which significantly limits the practical applicability of this approach. Other markers like kaolin clay particles and other crop-compatible liquid dyes have been used to offer a color contrast between the sprayed area and green plant surfaces. Since kaolin clay particles are subject to interfacial phenomena during droplet evaporation such as the coffee ring effect, kaolin clay is not a good candidate as a marker to quantify droplet coverage and are instead used like WSPs to detect where sprays are being deposited.

Crop dyes, such as turf dye, are currently used to quantify spray coverage. As long as the dyes do not modify the surface tension and viscosity of the droplets and do not interact with the pesticides, they may offer a simple method to generate contrast between the sprayed droplets and their background. Turf dyes are predominantly used in fields to indicate which parts of the field have already been sprayed, as shown in FIG. 3, where the arrows indicate the boundary between the sprayed and unsprayed areas. These dyes can be used on other crops to indicate droplet coverage; however, to date, it is believed no system has been developed to integrate these dyes with a sensing system that can allow farms to easily quantify coverage in real time. The instant specification describes such systems.

Camera and Vision Systems in Agriculture

With the advent of machine vision and precision agriculture, a number of sensory systems have been developed to help growers monitor their crops and optimize their operations on farms. Examples of these are described, for example, in Tian, H., Wang, T., Liu, Y., Qiao, X. & Li, Y., Computer vision technology in agricultural automation—a review, *Inf. Process. Agric.* 7, 1-19 (2020), the text of which is incorporated herein by reference in its entirety. Camera and vision systems are used to detect crop diseases, and monitor leaf growth, plant growth, crop stress, and yield. Within pesticide spraying, Blue River Technologies has pioneered See & Spray™ technology which uses machine learning to detect weeds and selectively spray them. This is described, for example, in U.S. Pat. Nos. 11,129,343; 11,093,745; 10,812,776; and 10,713,484, the texts of which are incorporated herein by reference in their entireties. Other imaging systems are also used to quantify droplet characteristics at the nozzle outlet, for example, systems manufactured by TeeJet® Technologies. To monitor spray coverage on WSPs, there are a number of smartphone apps available on the market. However, it is believed there is no vision system currently on the market that allows spray operators to measure spray coverage—and, more particularly, droplet coverage—directly on plant surfaces.

Example Commercial Applications: Pesticides

Farmers use large quantities of pesticides to protect their plants and increase yield. Pesticide usage can account for a large percentage of operating costs for farmers—for example, 50% for mature pistachio and almond trees, 30-40% for cotton, 25% for rice, and 18% for tomatoes. Reducing these costs may be crucial for the ability of a farm to sustain business and compete. Globally, the pesticide market amounts to $60B and is rapidly growing at a 6.9% CAGR. The systems described herein may compete indirectly with the agricultural adjuvant market which aims to make spraying more efficient via additives, and is a $4B market, growing at 5.2% CAGR. The technology described herein can also be applied to enhance application efficiencies of other agrochemicals such as foliar fertilizers which are a $3B market.

Software, Computer System, and Network Environment

Certain embodiments described herein make use of computer algorithms in the form of software instructions executed by a computer processor. In certain embodiments, the software instructions include a machine learning module, also referred to herein as artificial intelligence (AI) software. As used herein, a machine learning module refers to a computer implemented process (e.g., a software function) that implements one or more specific machine learning techniques, e.g., artificial neural networks (ANNs), e.g., convolutional neural networks (CNNs), random forest, decision trees, support vector machines, and the like, in order to determine, for a given input, one or more output values. In certain embodiments, the input comprises alphanumeric data which can include numbers, words, phrases, or lengthier strings, for example. In certain embodiments, the one or more output values comprise values representing numeric values, words, phrases, or other alphanumeric strings.

In certain embodiments, machine learning modules implementing machine learning techniques are trained, for example using datasets that include categories of data described herein. Such training may be used to determine various parameters of machine learning algorithms implemented by a machine learning module, such as weights associated with layers in neural networks. In certain embodiments, once a machine learning module is trained, e.g., to accomplish a specific task such as identifying certain response strings, values of determined parameters are fixed and the (e.g., unchanging, static) machine learning module is used to process new data (e.g., different from the training data) and accomplish its trained task without further updates to its parameters (e.g., the machine learning module does not receive feedback and/or updates). In certain embodiments, machine learning modules may receive feedback, e.g., based on user review of accuracy, and such feedback may be used as additional training data, to dynamically update the machine learning module. In certain embodiments, two or more machine learning modules may be combined and implemented as a single module and/or a single software application. In certain embodiments, two or more machine learning modules may also be implemented separately, e.g., as separate software applications. A machine learning module may be software and/or hardware. For example, a machine learning module may be implemented entirely as software, or certain functions of a ANN module may be carried out via specialized hardware (e.g., via an application specific integrated circuit (ASIC)).

Figure 4:
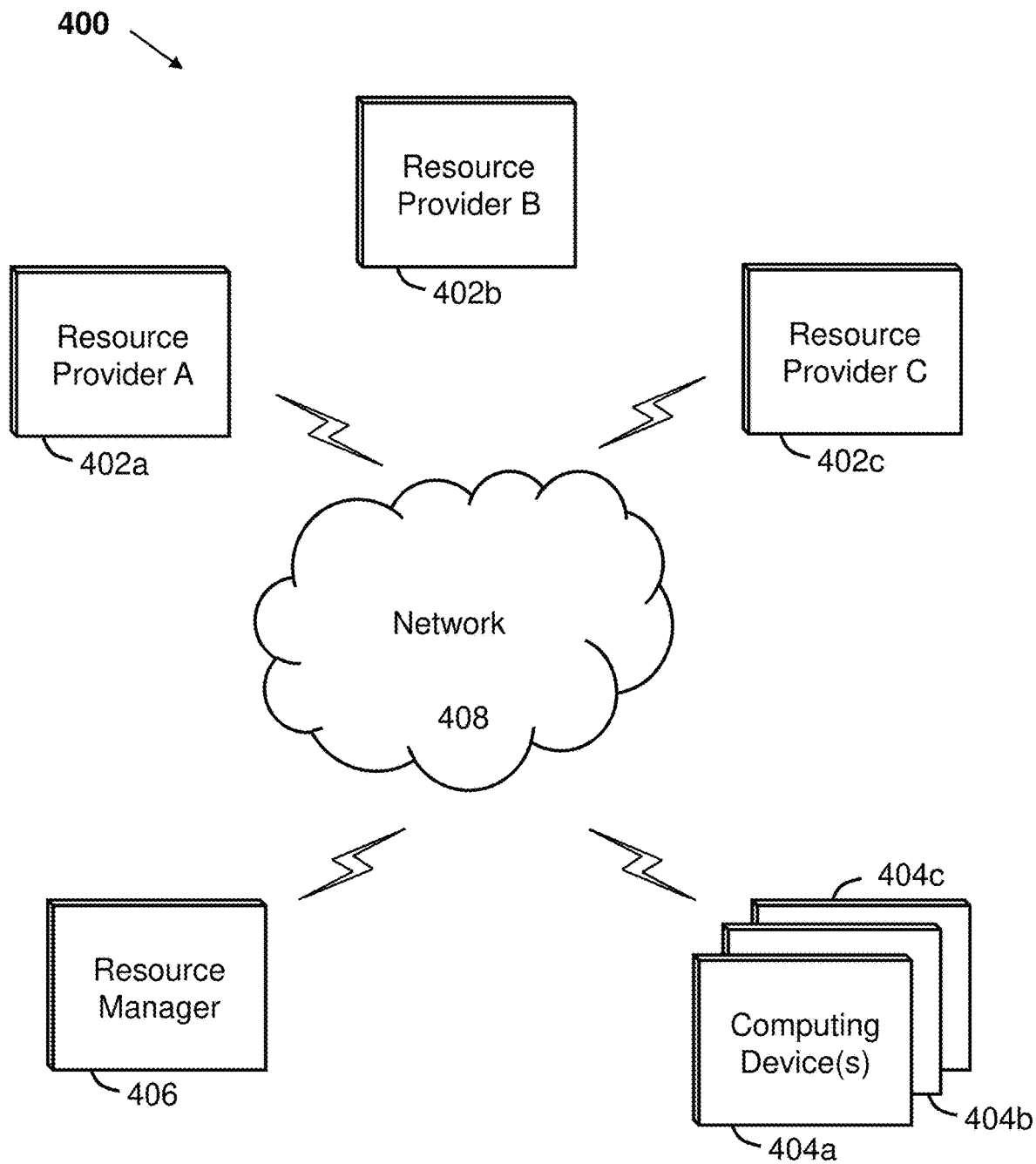
FIG. 4 is a schematic showing an implementation of a network environment for use in providing systems, methods, and architectures as described herein, according to an illustrative embodiment.

As shown in FIG. 4, an implementation of a network environment 400 for use in providing systems, methods, and architectures as described herein is shown and described. In brief overview, referring now to FIG. 4, a block diagram of an exemplary cloud computing environment 400 is shown and described. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing device 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Figure 5:
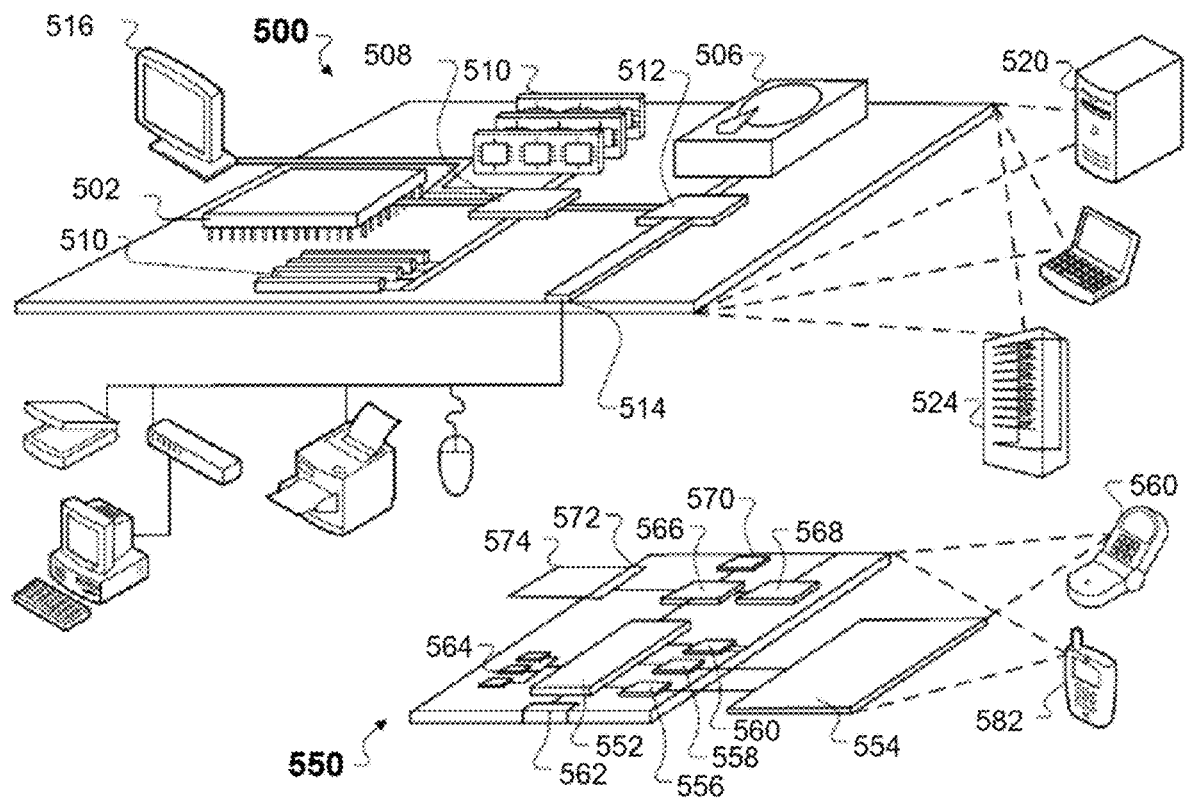
FIG. 5 is a schematic showing exemplary computing devices that can be used to implement the techniques described, according to an illustrative embodiment.

FIG. 5 shows an example of a computing device 500 and a mobile computing device 550 that can be used to implement the techniques described in this disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth®, Wi-Fi™, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, certain modules described herein can be separated, combined or incorporated into single or combined modules. Any modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein.

While the invention has been particularly shown and described with reference to specific preferred embodiments, it should be understood by those skilled in the art that various changes in form and detail may be made therein without departing from the spirit and scope of the invention as defined by the appended claims.

Implementations and Field Test Results

Implementations

Figures 6A, 6B:
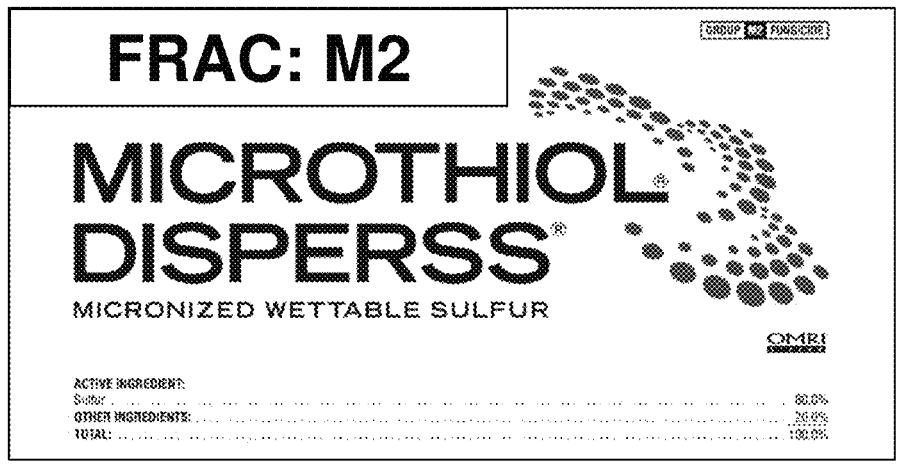
FIG. 6A is a diagram of a product label from a commercial fungicidal sulfur product, belonging to Fungicide Resistance Action Committee (FRAC) class M2.
FIG. 6B is a table of suggested dose rates for a commercial fungicidal sulfur product for different crops and pests.

Conventional agricultural products (e.g., pesticides, foliar fertilizers, and the like) that are sprayed onto plant surfaces (e.g., leaves, stalks, fruits, and the like) can vary greatly in the suggested spray rates, and are not well optimized for particular crops. For example, FIG. 6A is a diagram of a product label from a commercial fungicidal sulfur product, belonging to Fungicide Resistance Action Committee (FRAC) class M2, and FIG. 6B is a table of suggested dose rates for a commercial fungicidal sulfur product for different crops and pests. The ranges of suggested spray rates of this product vary widely, and are only given as pounds of product per acre, requiring 5-60 gallons of water per acre, with no recommended dilution for application. Furthermore, varieties of crops are grouped together, such as beans and peas in the bottom row, given the same suggestion of 3-10 lbs./acre. However, in practical implementations of sprays, the leaves of beans and peas may have very different coverages as shown in FIG. 6C. For the same 50 gallons/acre, 4 lb./acre spray, bean leaves have 100% coverage due to their hydrophilic surfaces while pea leaves only have 35% coverage due to their hydrophobic surfaces.

In certain embodiments, the system described herein includes a computing device with process and memory, one or more imaging devices, one or more environmental sensors, an adjustable sprayer system, an electronic injection system, and a control system for controlling system parameters in the sprayer system. In some embodiments, this system may be implemented as separate components or as combined components in a closed unit. In other embodiments, this system (or a portion thereof) may be mounted to a spraying mechanism, for example, a plow or an agricultural sprayer (for example, a boom sprayer, a boomless sprayer nozzle, a mist sprayer, a three-point hitch sprayer, a truck-bed sprayer, a towing-hitch sprayer, a UTV sprayer, an ATV sprayer, a self-propelled sprayer, a towed sprayer, a robotic sprayer, a hand sprayer, or a backpack sprayer). In some embodiments, this system (or a portion thereof, e.g., the one or more imaging devices and/or sensors) is mounted to a drone (i.e., a small unmanned aerial vehicle). The computing device may be implemented as a portable device mounted on the spray mechanism, or the sensors and imaging devices may transmit data wirelessly to a computing device located elsewhere, either locally near the system or in a remote server, cloud computing facility, etc.

In some embodiments, the system is or comprises a hand-operated unit, with one or more cameras to capture images, said camera(s) coupled to a mobile device and/or an onboard computer processor to measure liquid coverage and to provide recommendations. In some embodiments, the system is or comprises a robotic system, a hand-operated system, or a mechanized farm implement which is driven, towed, or otherwise moved over a field that is being sprayed, in order to measure liquid coverage on the plant surfaces.

In some embodiments, calculations are performed in real time (e.g., near real-time), allowing adjustments to spray conditions to be implemented immediately and/or adjusted over time during the spray session. In some embodiments, calculations may be performed not in real time, and adjustments to spray conditions implemented in a later spraying session.

Figure 13A:
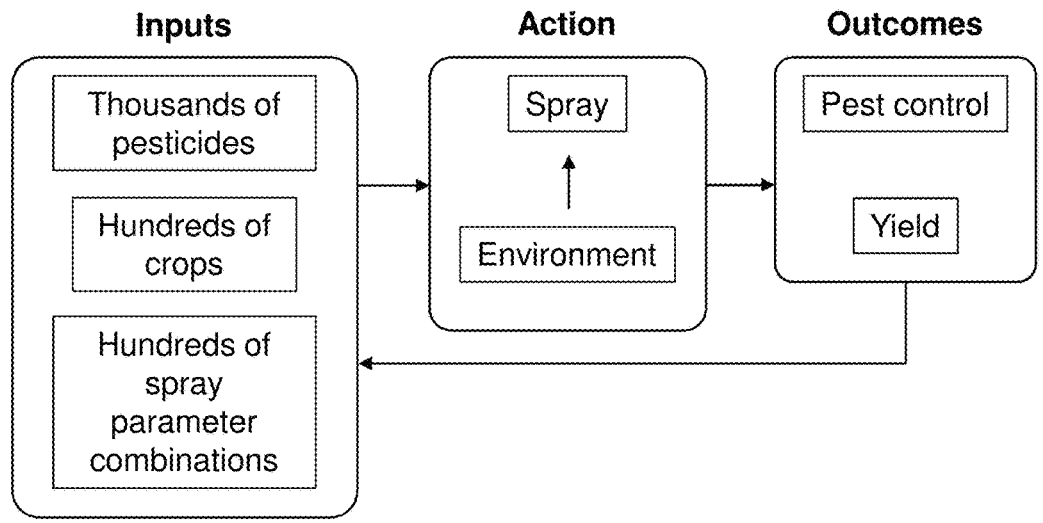
FIG. 13A is a flow chart diagram of a typical season-long feedback loop involving pesticides, crops, and spray parameter combinations to achieve optimal pest control and yield.

In a conventional implementation, a season-long feedback loop exists, as illustrated in FIG. 13A. There are thousands of pesticides, hundreds of crops, and hundreds of spray parameter combinations that can be considered as inputs to actions the grower may take. Each of these inputs can be varied across a range of values, and are implemented in various actions, including the spraying of pesticides and/or fertilizer, according to the environmental conditions. The outcomes are then pest control and/or crop yield. Because the outcomes may not be immediately clear until sufficient time has passed for the pesticides and/or fertilizers to influence the growth of pests and plants, the feedback loop may take multiple weeks within or over the entire growing season.

Figure 13B:
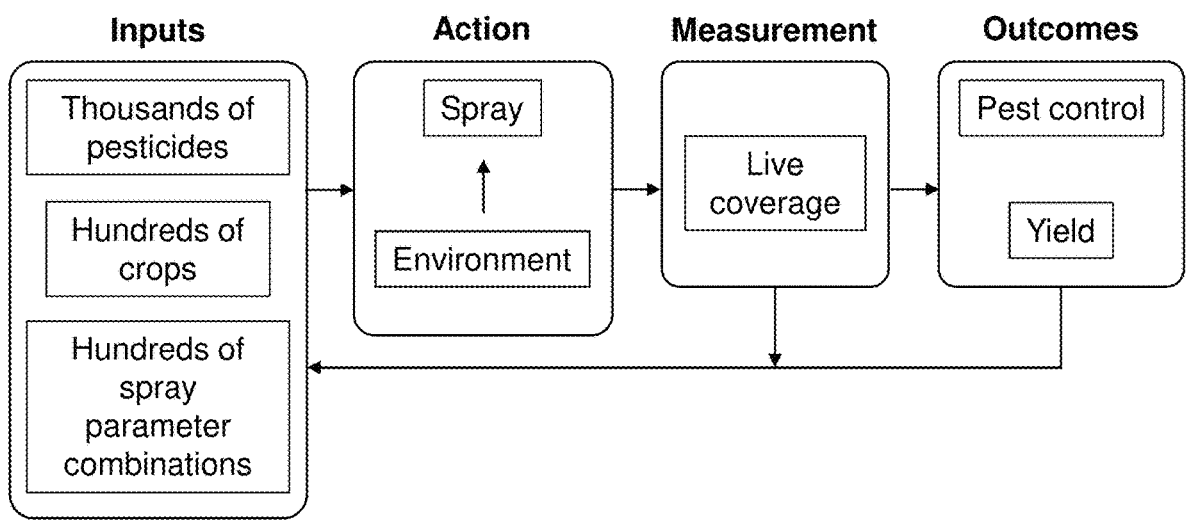
FIG. 13B is a flow chart diagram illustrating the addition of an instant feedback loop in the form of live measurement of coverage levels to supplement the season-long feedback loop, according to an illustrative embodiment.

In the present embodiments, the system may provide an instant feedback loop that supplements the season-long feedback loop, as illustrated in FIG. 13B. The additional measurement step, where liquid coverage (e.g., the coverage of liquid spray droplets, films, and/or pools) on plant surfaces is measured live in real time (e.g., near real-time), allows much faster feedback so that spray conditions can be quickly adjusted. The effect of real-time or near-real-time adjustments to spray conditions on pest control and/or yield are thus supplements to the season-long feedback loop.

Figure 15:
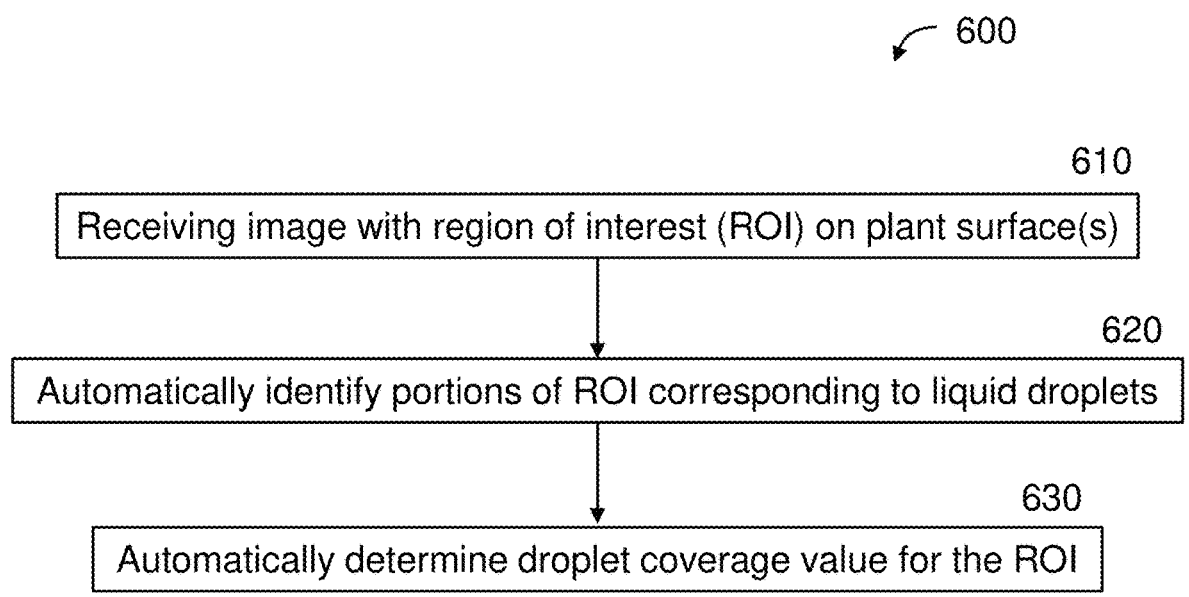
FIG. 15 is a flow chart illustrating a method of automatically quantifying liquid coverage on plant surfaces, according to an illustrative embodiment.

A general method 600 for automatically quantifying liquid coverage on plant surfaces is shown in FIG. 15. In step 610, a processor of a computing device receives an image with a region of interest (ROI) on plant surface(s). In step 620, the processor identifies portions of the ROI corresponding to liquid that has been sprayed on the plant surfaces. In step 630, the processor automatically determines a liquid coverage value for the ROI.

The methods and systems of automatically determining liquid coverage on the surface of plants, described herein, allow for the more efficient and effective use of agrochemicals as a function of crop type (plant type), environmental conditions, spray configuration, sprayed-on solution composition, and other variables. Instead of waiting a season for a data point, feedback can be almost immediate. It is possible to account for local conditions and optimize spray parameters in real time, thereby improving agricultural productivity and avoiding unnecessary waste and cost, making a more efficient use of the agrochemicals (e.g., pesticides and/or fertilizer).

Figure 16A:
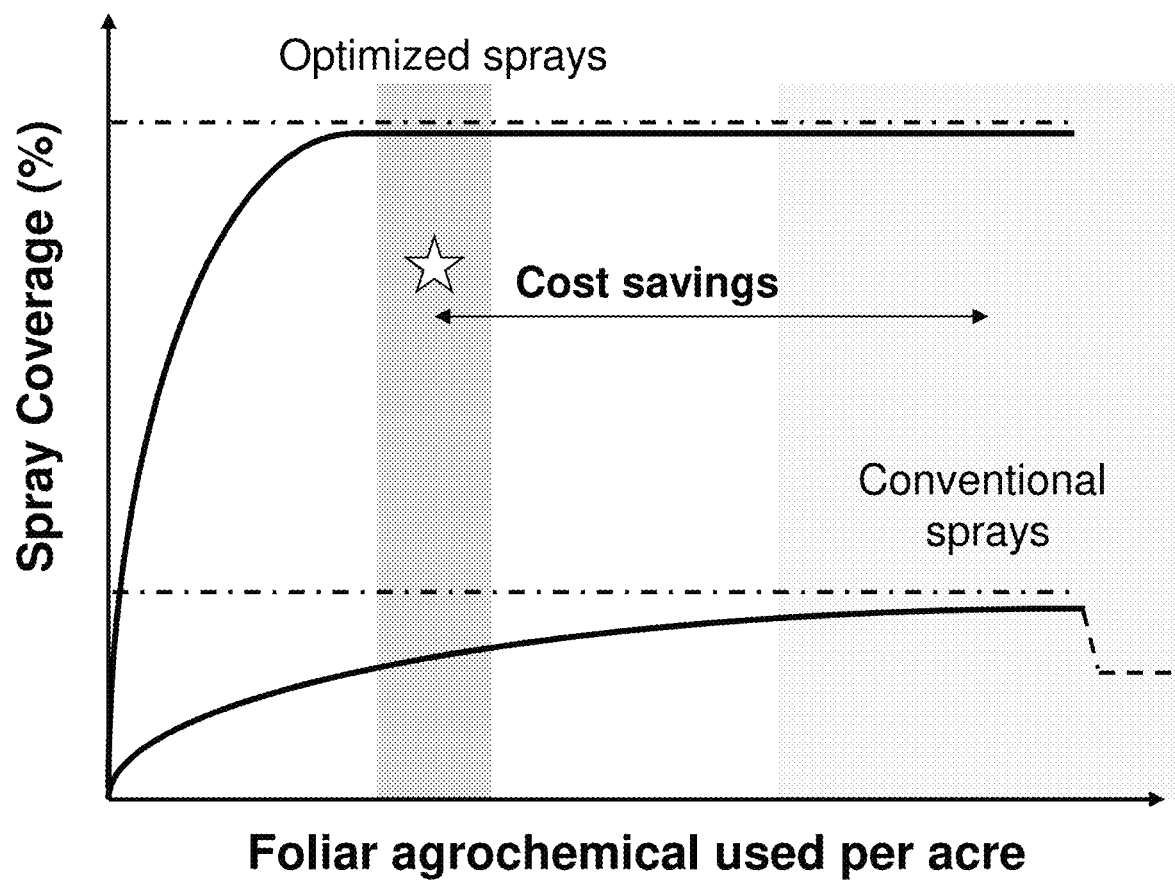
FIG. 16A is an example plot of liquid coverage (%) as a function of amount of foliar agrochemical used per acre for a conventional spray (lower curve) and an optimized spray (upper curve), according to an illustrative embodiment.

FIG. 16A shows an example plot of spray coverage (%) as a function of amount of foliar agrochemical used per acre for a conventional spray solution (lower curve) and an optimized spray solution (upper curve), according to an illustrative embodiment. For a conventional spray (lower curve), the spray coverage gradually increases to reach some saturation level, and may even decrease at higher levels of agrochemical usage due to droplets coalescing on leaves and even dropping away. For an optimized spray, which may have various adjuvants formulated to increase liquid adhesion on surfaces of plants, the spray coverage may reach saturation levels more quickly (e.g., at lower levels of agrochemical usage) and may not exhibit a drop-off due to coalescence of droplets. The shaded regions of the plot indicate the different amounts of agrochemical needed for the conventional sprays and optimized sprays, and the difference between them may then translate into cost savings. Moreover, it is possible to determine an optimum amount of foliar agrochemical used per acre to achieve a desired liquid coverage percentage. In the plot of FIG. 16A, the upper curve representing "optimized sprays" achieves a high spray coverage even at low amounts of foliar agrochemical used. One may choose a low level of agrochemical that achieves a desired liquid coverage, with some amount over the minimum needed to achieve such level to provide some buffer due to uncertainty. For example, one may choose an amount of foliar agrochemical in the dark shaded region of FIG. 16A, using the optimized spray. Thus, it may be possible to both achieve advantageous liquid coverage, thereby providing superior yield and/or pest control, while also saving the expense of using too much agrochemical.

FIG. 16B is a series of screenshots from a video of a leaf sprayed with an aqueous solution of a conventional adjuvant, showing formation of large droplets and incomplete coverage, according to an illustrative embodiment. FIG. 16C is a series of screenshots from a video of a leaf sprayed with an aqueous solution of an improved adjuvant, showing formation of smaller droplets with higher overall coverage, according to an illustrative embodiment. In both FIG. 16B and FIG. 16C, the top images are at the start before spraying, the middle images are during spraying, and the bottom images are after spraying. In the example of spraying with a conventional adjuvant in FIG. 16B, a longer time of spraying is required for saturation to be reached, resulting in larger droplets and lower liquid coverage of the plant surface. In the example of spraying with an improved adjuvant in FIG. 16C, a shorter time of spraying is required for saturation to be reached, resulting in smaller droplets and higher liquid coverage of the plant surface.

Figure 17:
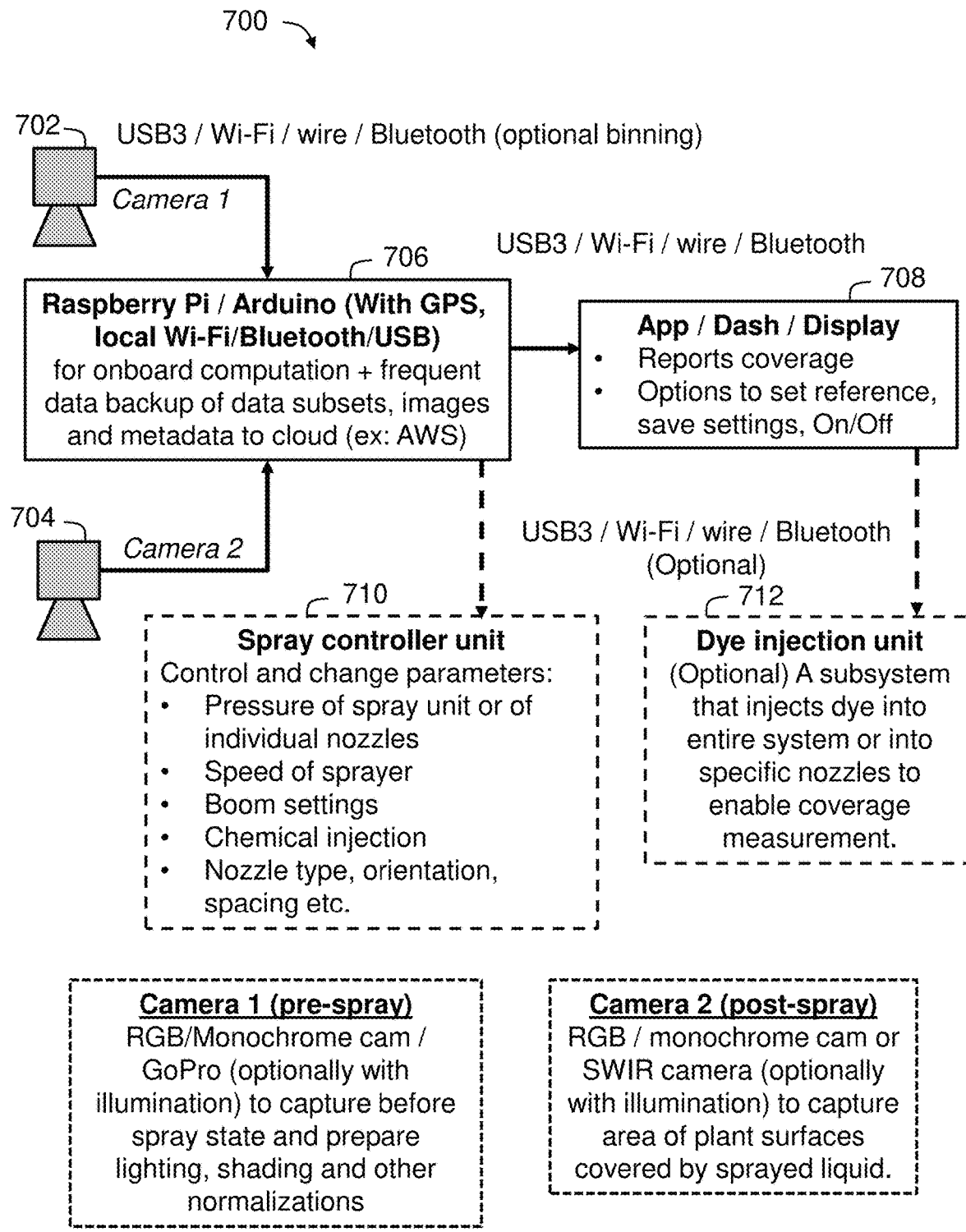

FIG. 17 is a schematic diagram of an example implementation of a spraying system 700 with two cameras 702 and 704, an onboard computer 706, a results display system 708, a spray controller unit 710, and an optional dye injection unit 712, according to an illustrative embodiment. Camera 1 (702) may be implemented as a pre-spray camera, mounted to the spray system in such a way as to capture images of plants before any spraying occurs, for example, so that various image pre-processing can be conducted. In some embodiments, Camera 1 may be an RGB camera, a monochrome camera, a video camera, a still camera, a digital camera, or a portable action camera (e.g., GoPro), for example. Illumination in the form of monochromatic or broadband light sources may be included. Camera 2 (704) may be implemented as a post-spray camera, mounted to the spray system in such a way as to capture images of plants after spraying. The pre-processed information from Camera 1 may be used to assist processing of images from Camera 2 in order to calculate liquid spray coverage on plant surfaces. Camera 2 may be an RGB camera, a monochrome camera, a video camera, a still camera, a digital camera, a portable action camera (e.g., GoPro), or a SWIR camera. Illumination in the form of monochromatic or broadband light sources may be included.

In some embodiments, an onboard computer processor 706 (for example, a laptop or other mobile computing device such as a smart phone) may be used to perform onboard computations and frequent backup of data subsets, images, and metadata to a cloud or remote service. In some embodiments, the onboard computer may be a Raspberry Pi or Arduino computer. In some embodiments, the onboard computer may include communications modules such as GPS (global positioning system), local Wi-Fi, Bluetooth, and USB (universal serial bus) connections.

In some embodiments, the system 700 may include a spray controller unit 710 which may be used to control and change parameters of the spray system including pressure of spray unit or of individual nozzles, speed of sprayer, boom settings, chemical injection, nozzle type, nozzle orientation, nozzle spacing, and the like. In some embodiments, the system 700 may include a dye injection unit, which is an optional subsystem that injects dye into the entire spray system or into specific nozzles to enable visual measurement of sprayed-on liquid coverage on plant surfaces.

Figure 18:
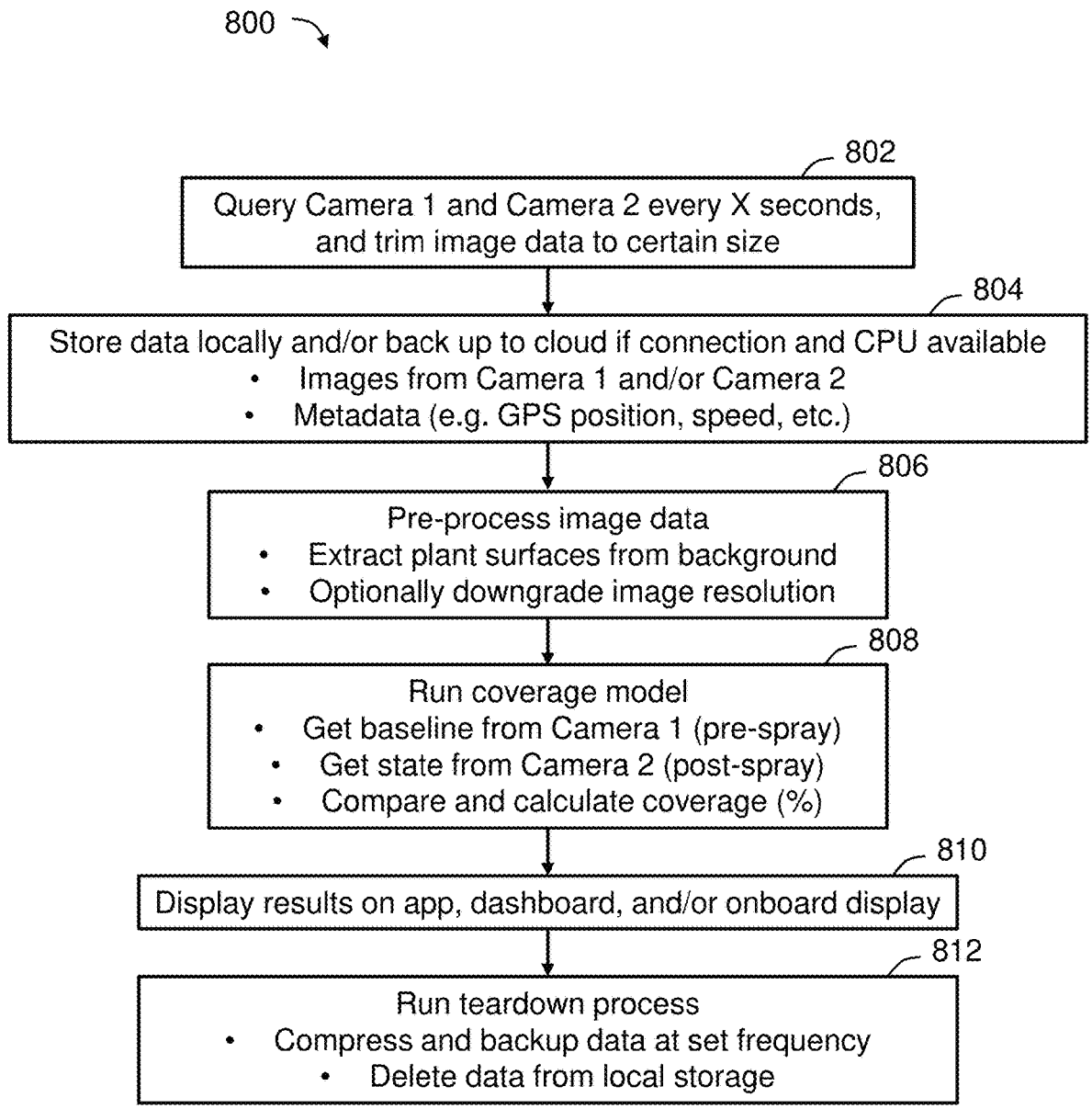

FIG. 18 is an example of a method of obtaining images from two cameras, processing images, and handling data, according to an illustrative embodiment. This method may include steps that are taken by a processor in a spraying system. In step 802, the processor may query Camera 1 and Camera 2 every X seconds, and trim the image data to a certain size. In some embodiments, the period X may be between 0.1 and 10 seconds. In step 804, the processor may store data locally and/or back up the data to a cloud or remote computer if there is both a data connection and CPU available. The data being stored and/or backed up may include images from Camera 1 and/or Camera 2, and metadata (e.g., GPS position, speed, etc.)

Referring still to FIG. 18, in step 806 the processor pre-processes image data, which may include extracting plant surfaces from the background, and optionally downgrading the image resolution. A variety of image processing methods may be used to identify a region of interest (e.g., portions of the image corresponding to the surfaces of plants), and to identify and remove the background, including color thresholding, edge detection, filtering, deep learning, neural networks, convolutions, depth estimation, active learning, and transfer learning. In step 808, the processor runs a coverage model which obtains a baseline from Camera 1 (pre-spray), obtains a state from Camera 2 (post-spray), and compares them to calculate a liquid coverage value (e.g., a percentage of the visible plant surface covered by sprayed-on liquid). In some embodiments, a running average of values may be calculated from each camera over a defined subset of most recent images or image data, and may be used as quantities for comparison and further calculations.

In step 810, the processor displays the results calculated in step 808 on a communications module which may include a mobile application, dashboard, onboard display, user interface, and the like. In some embodiments, this data may include coverage values calculated from step 808, and may also include suggested changes to a spray pattern (e.g., change sprayer movement speed, change sprayer pressure, change mixture of spray, and the like). In some embodiments, the suggested spray changes may be implemented in real time by a spray controller unit. In some embodiments, the suggested spray changes may be displayed and a user may choose to manually implement the suggested changes. In some embodiments, coverage values, metadata, sprayer conditions, and other data may be directly communicated to farm management software that may be running on the same computing device that is running the sprayer system or on another remote computing device.

In step 812, the processor runs a teardown process which may include compressing and backing up data at a particular set frequency, and deleting data from local storage.

Figure 19:
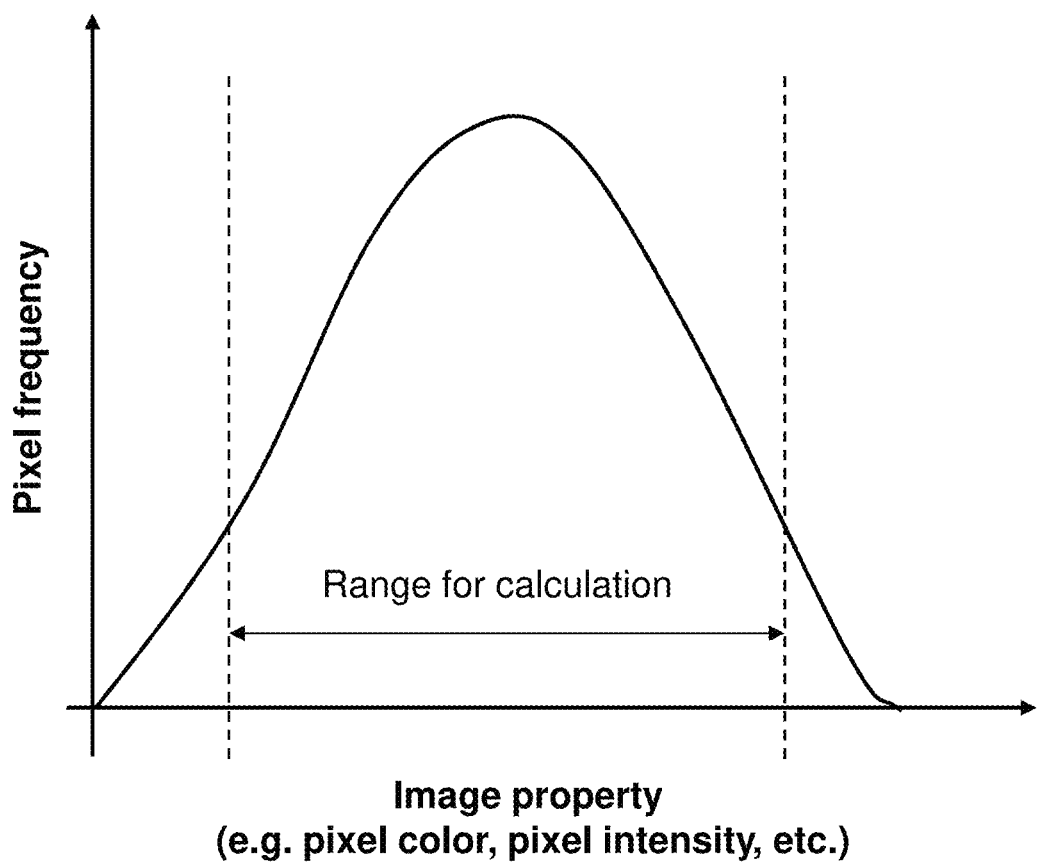
Figure 20:
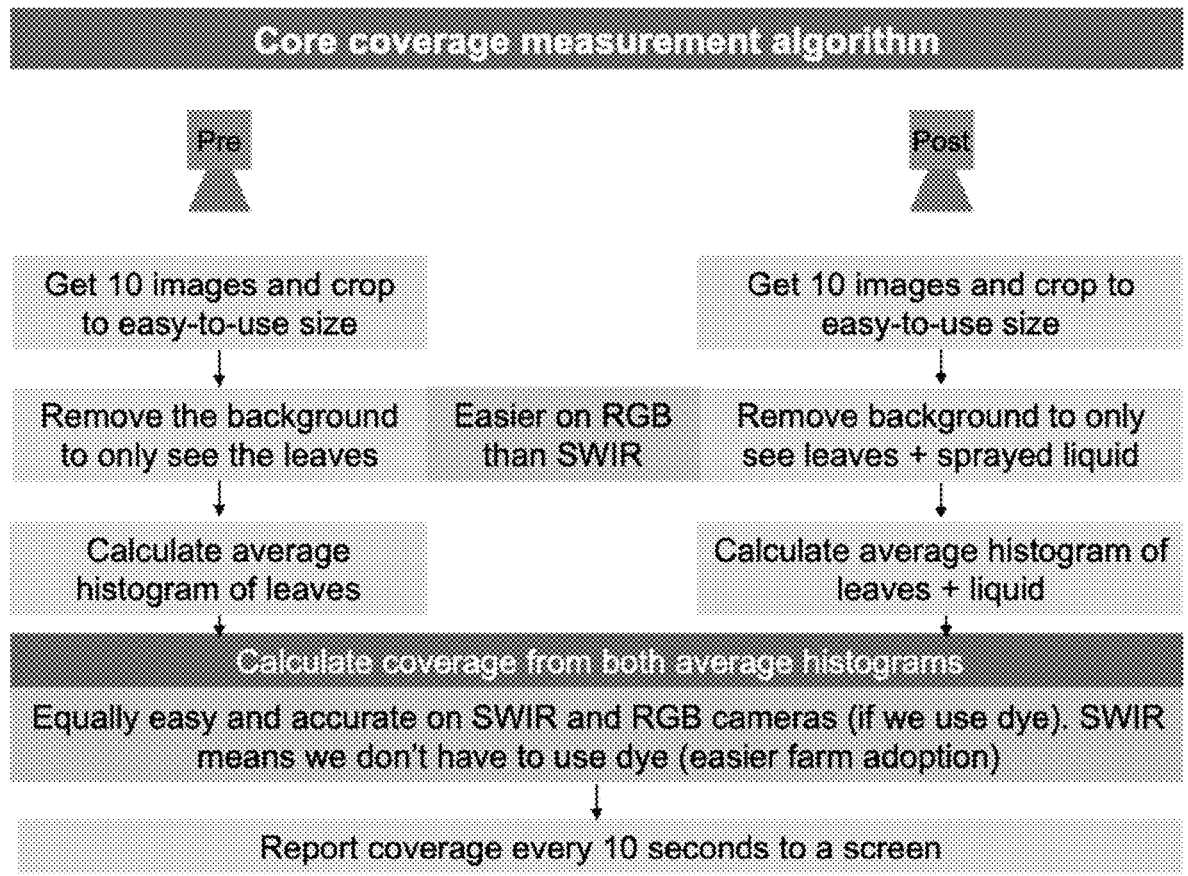
Figure 21:
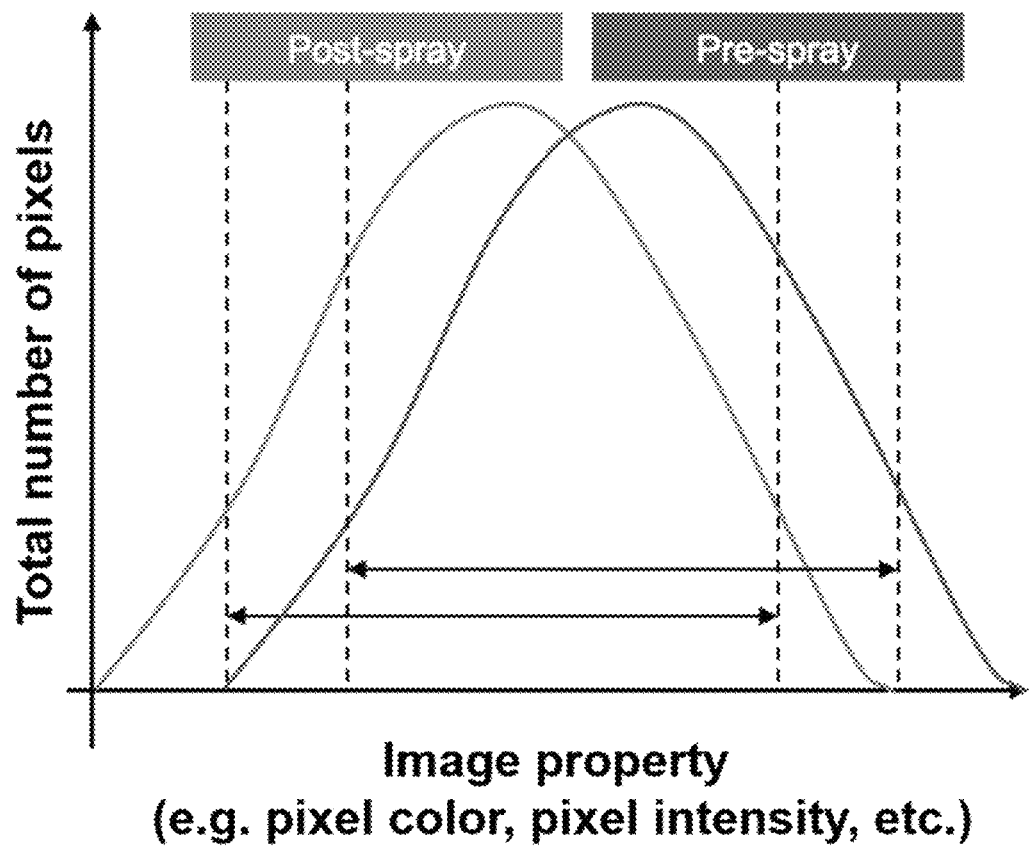

FIG. 19 is a plot of an example histogram of a property of an image calculated across all pixels of an image, and a range of the pixels used for calculation and/or image processing, according to an illustrative embodiment. For example, a histogram of pixel intensity for a monochrome image may have horizontal axis values between 0 and 255, while the vertical axis shows the number of pixels within a certain range of pixel intensities. In some embodiments, an image processing method may account for pixels represented the region of the histogram near the central portion of the distribution, and leave out the tails of the distribution. This method of color thresholding may require lower processing power, and may be used to identify distributions of pixels that correspond to certain plant features or background features.

Field Test Results

Figure 7A:
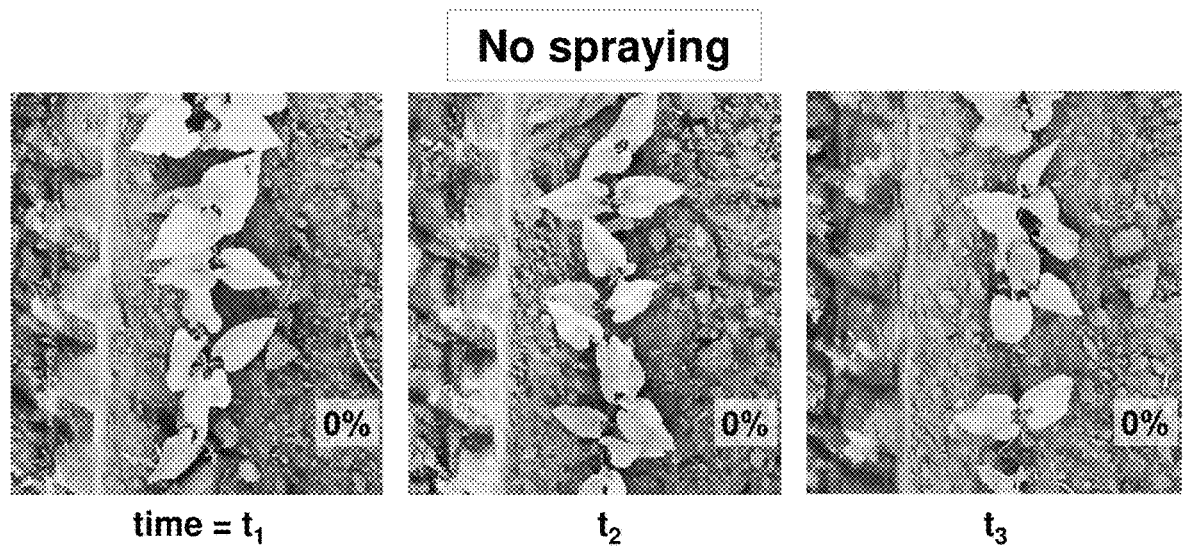
FIG. 7A are three frames taken from a video of a real-time image analysis of a row of crops with no spraying, showing identification of 0% droplet coverage via automated image analysis according to an illustrative embodiment.
Figure 7B:
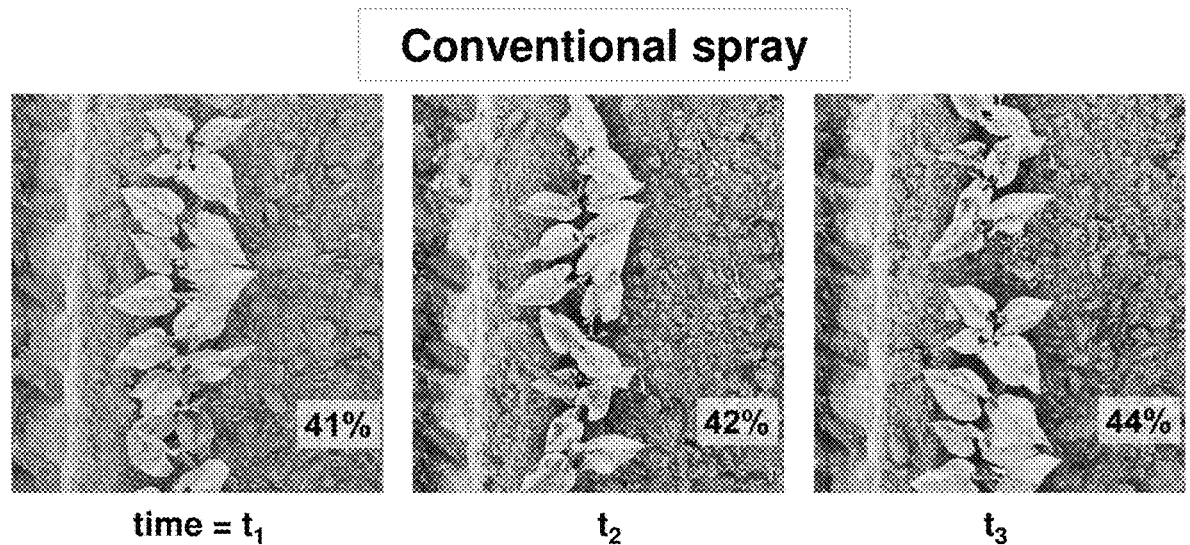
FIG. 7B are three frames taken from a video of a real-time image analysis of a row of crops with a conventional spray system, showing changing droplet coverage in each frame, as identified via automated image analysis according to an illustrative embodiment.

FIGS. 7A and 7B show multiple frames taken from a video of a real-time image analysis of a row of crops, where the video was taken by a camera positioned on the back of a sprayer boom moving at some velocity along the row of crops. In FIG. 7A, no spraying is occurring, and the image analysis shows 0% droplet coverage on the leaves in all the images. In FIG. 7B, a conventional spray was used, and the image analysis shows varying droplet coverage on the leaves in the images from frame to frame.

Figure 8A:
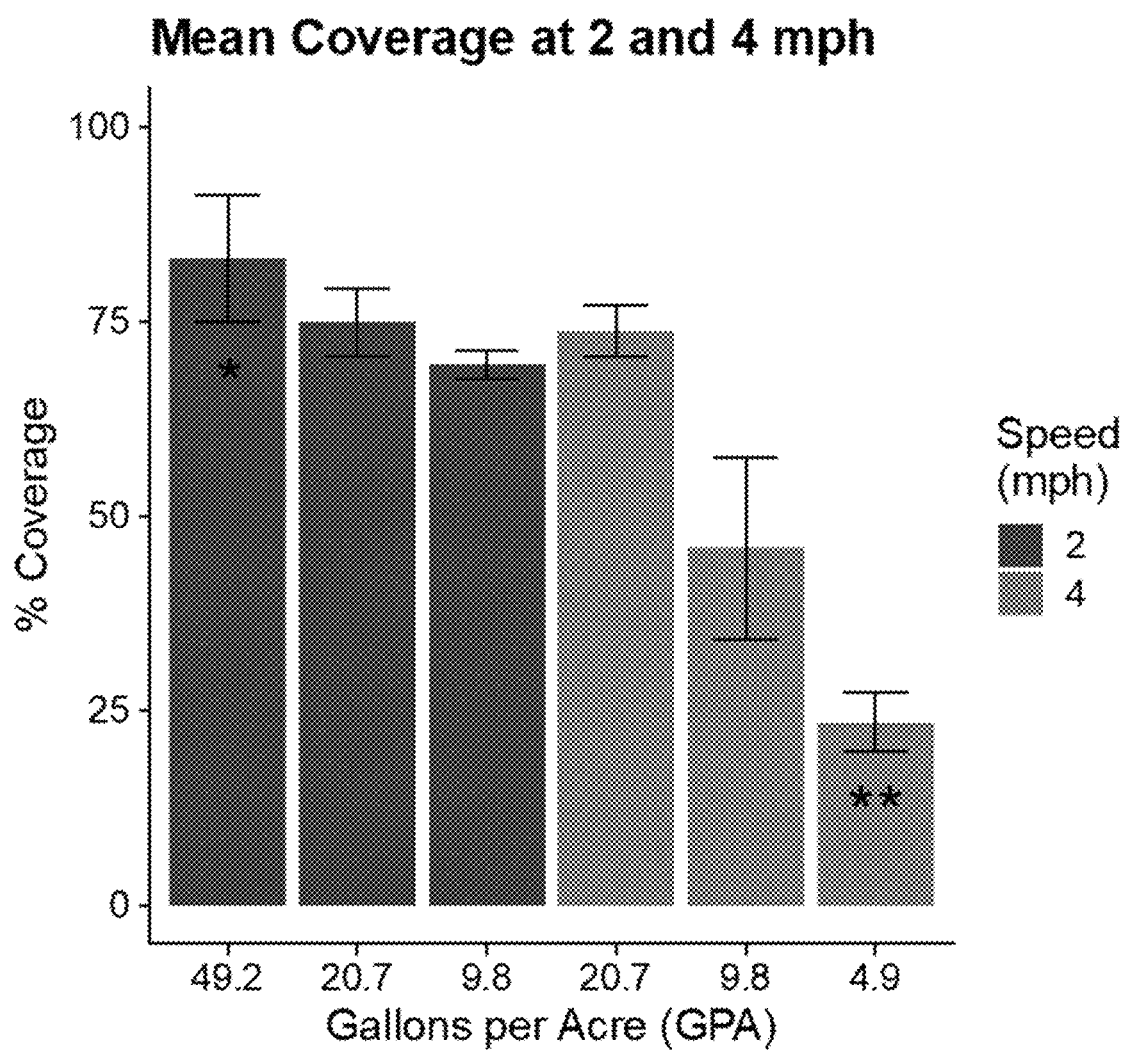
FIG. 8A is a plot of mean droplet coverage as a function of different spray rates in gallons per acre (GPA) and spray speeds (2 mph and 4 mph), according to an illustrative embodiment.
Figure 8B:
FIG. 8B is a representative photograph of a leaf corresponding to the coverage and spray conditions indicated by an asterisk (*) in the plot in FIG. 8A, according to an illustrative embodiment.
Figure 8C:
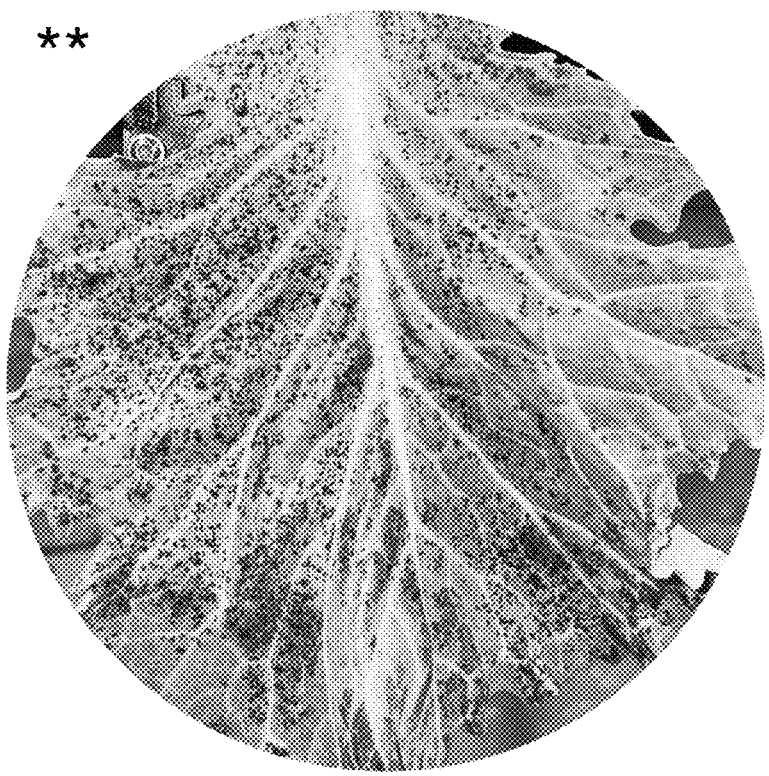
FIG. 8C is a representative photograph of a leaf corresponding to the coverage and spray conditions indicated by two asterisks (**) in the plot in FIG. 8A, according to an illustrative embodiment.

Using the system, droplet coverage was measured as a function of spray rate in gallons per acre (GPA) at two different movement speeds, 2 mph and 4 mph, as shown in FIG. 8A. This data shows that at 2 mph, similar coverage levels can be achieved with much lower spray rates, which means less solution needs to be used. Representative photographs of leaves at the spraying conditions indicated by the asterisk (*) and two asterisks (**) are shown in FIGS. 8B and 8C, respectively.

Figure 9A:
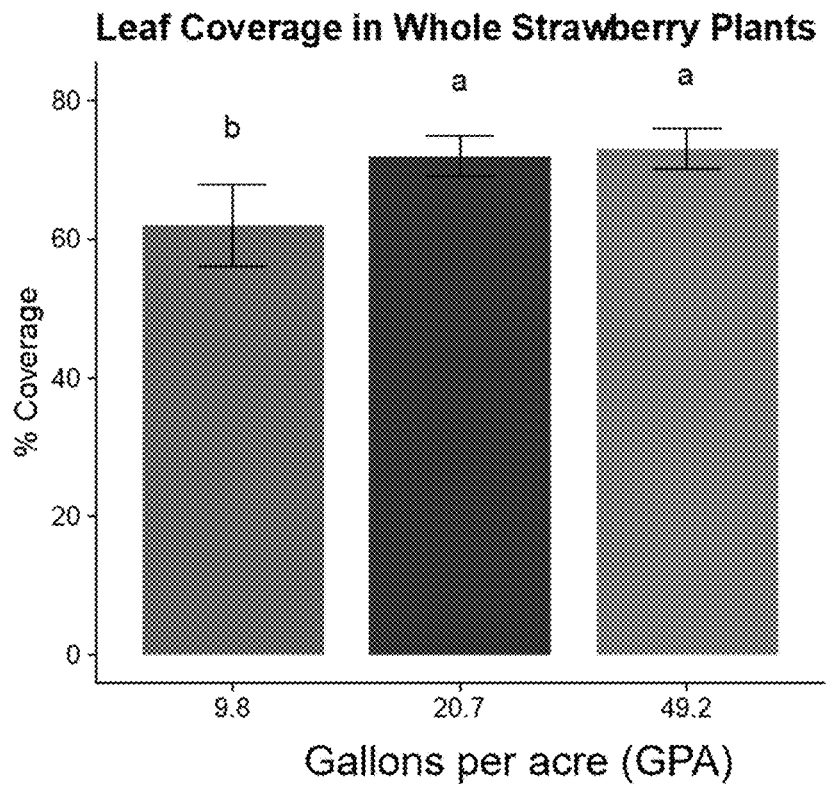
FIG. 9A is a plot of leaf coverage in whole strawberry plants in three different experiments at different spray rates in gallons per acre (GPA), according to an illustrative embodiment.
Figure 9B:
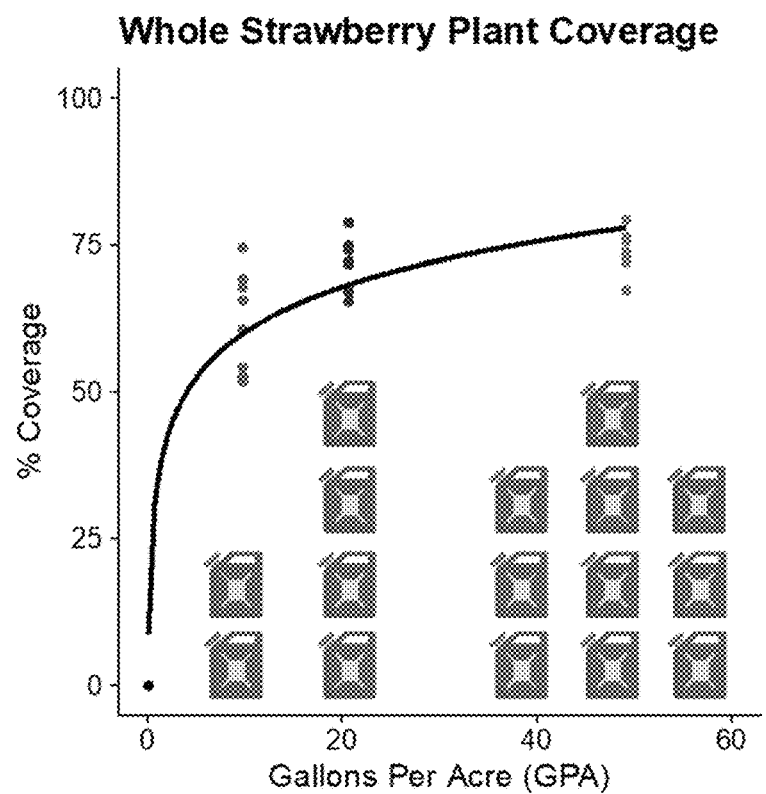
FIG. 9B is a plot of whole strawberry plant coverage as a function of spray rate in gallons per acre (GPA), according to an illustrative embodiment.

Field tests with whole strawberry plants were conducted with a commercial adjuvant and the system of the present embodiments. FIGS. 9A and 9B are plots of leaf coverage in whole strawberry plants in three different experiments at different spray rates in gallons per acre (GPA). These results show similar coverage levels across spray rates.

Figure 9C:
FIG. 9C is an automatically-identified region of interest (ROI) of an image according to an illustrative embodiment, said ROI corresponding to the plant surfaces that are visible in the image, wherein the plant surfaces are leaves of strawberry plants before spraying.
Figure 9D:
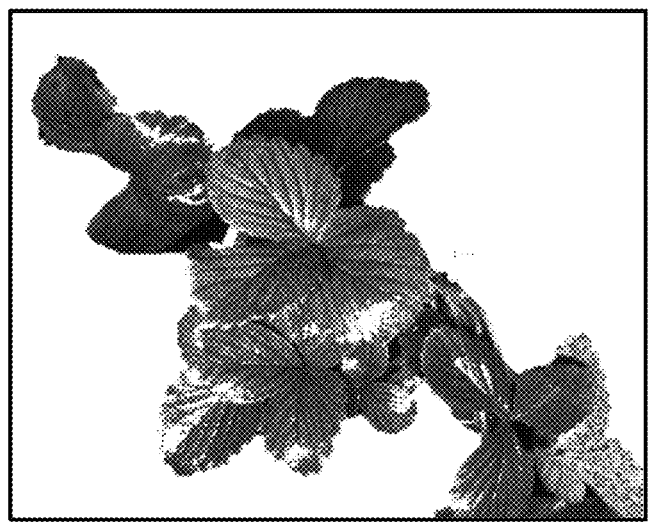
FIG. 9D is an automatically-identified region of interest (ROI) of an image, said ROI corresponding to the plant surfaces that are visible in the image, wherein the plant surfaces are leaves of strawberry plants after spraying with water dyed red and illuminated with green light, according to an illustrative embodiment.

FIG. 9C is an automatically-identified region of interest (ROI) of an image, said ROI corresponding to the plant surfaces that are visible in the image, wherein the plant surfaces are leaves of strawberry plants before spraying. FIG. 9D is an automatically-identified region of interest (ROI) of an image, said ROI corresponding to the plant surfaces that are visible in the image, wherein the plant surfaces are leaves of strawberry plants after spraying with water dyed red and illuminated with green light. These photographs were obtained with a monochrome camera, demonstrating that liquid coverage can be easily seen with the use of the red dye and green light. In both images, the background has been removed by the automated image analysis algorithm described herein. The spray achieves continuous liquid film coverage of the leaf surface.

Figure 11A:
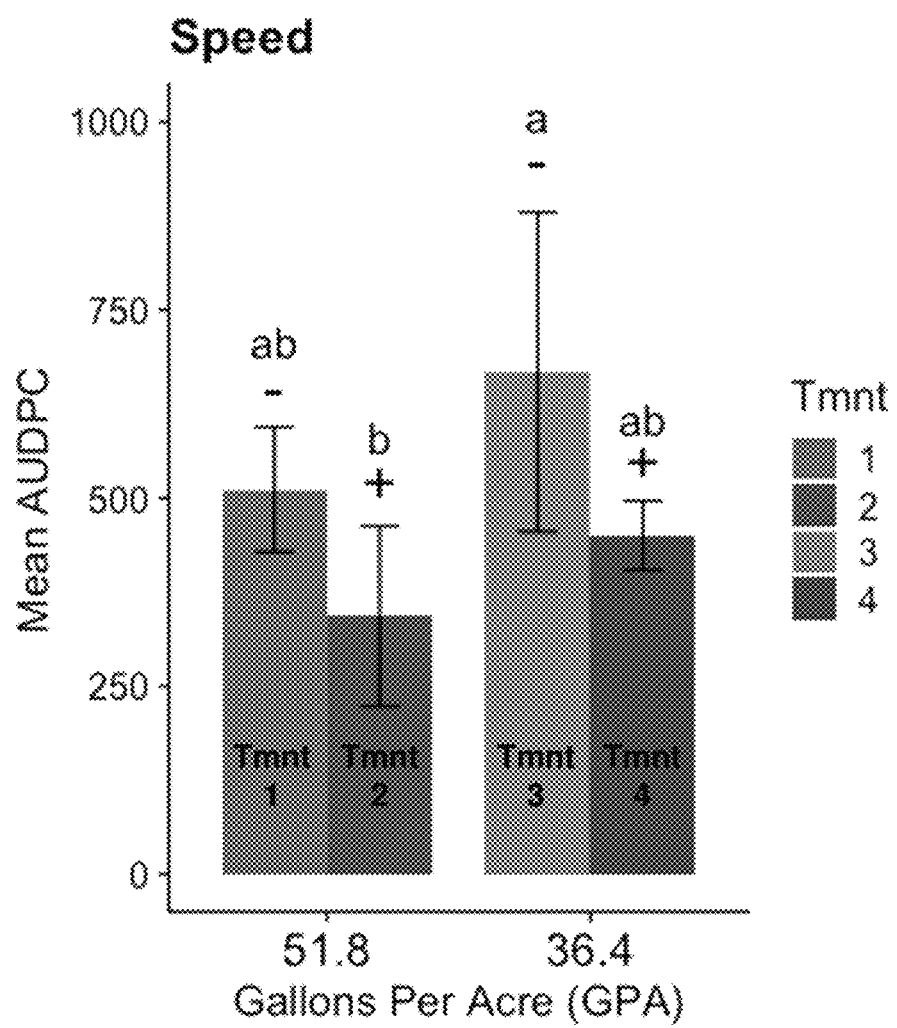
FIG. 11A is a plot of mean area under disease progress curve (AUDPC) for fungicide applied with different spray speeds, according to an illustrative embodiment.
Figure 11B:
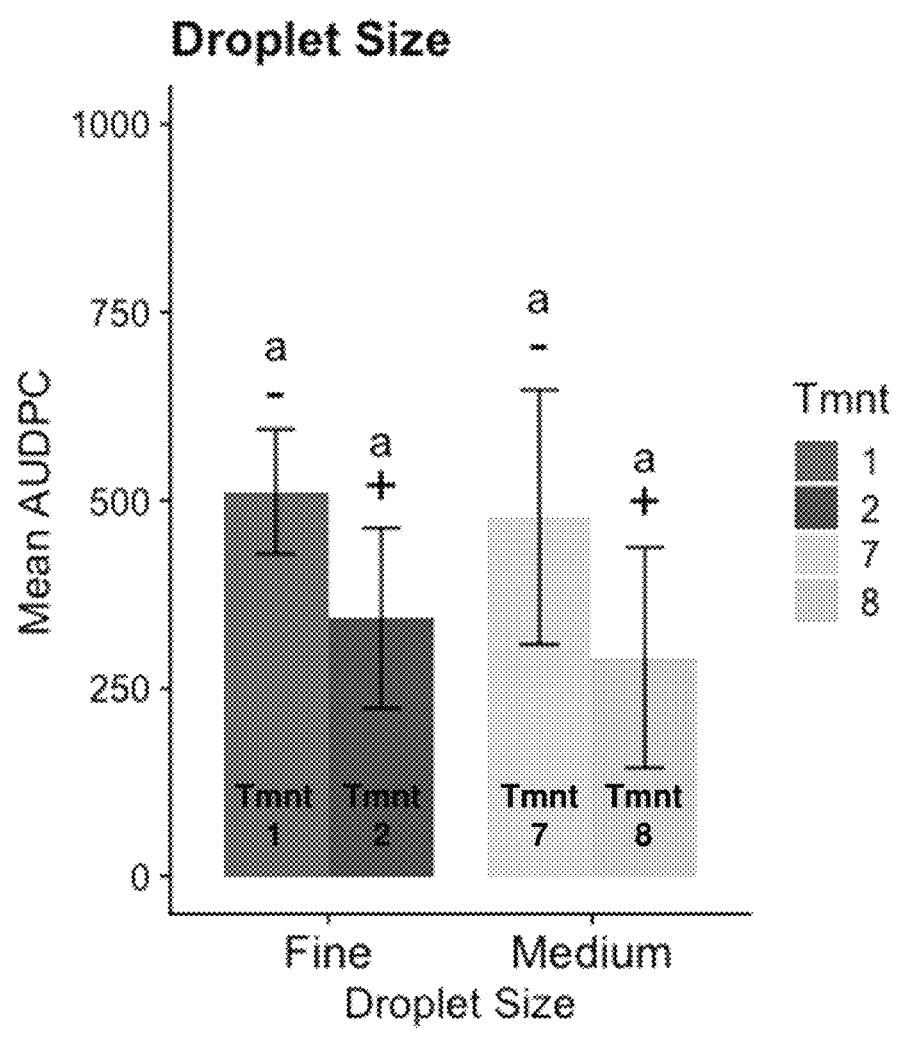

Field tests to control powdery mildew in squash using fungicide were conducted using constant pressure, nozzles, per nozzle flow rates, and droplet size ratings, but with different combinations of spray chemistries, sprayer speeds, and adjuvants. The treatment conditions are summarized in FIG. 10. The degree of control of mildew is measured as mean area under disease progress curve (AUDPC) as shown in FIGS. 11A and 11B. The mean AUDPC is higher for less controlled mildew. FIG. 11A shows a plot of mean AUDPC as a function of speed, FIG. 11B shows a plot of mean AUDPC as a function of concentration, and FIG. 11C shows a plot of mean AUDPC as a function of droplet size. In all the results, the addition of the adjuvant decreases the mean AUDPC, indicating better control of mildew.

FIG. 12 are photographs of examples of cabbage leaves sprayed with water only (top), with an aqueous solution of a commercial adjuvant (middle), and with an aqueous solution of the improved adjuvant (bottom), with different surface coverage levels. The water only spray resulted in 18% coverage, the commercial adjuvant resulted in 4% coverage, and the improved adjuvant resulted in 68% coverage.

The system may use a camera, such as a SWIR camera or a visible light camera, to capture videos or sequences of still images of plant surfaces before and/or after being sprayed with a solution. FIG. 14, shows photographs taken using a SWIR camera of a leaf with droplets taken at different camera exposure levels and intensity display ranges. It is advantageous to use a SWIR camera to monitor coverage of aqueous solutions sprayed on surfaces of plants, since sufficient detectable contrast can be achieved for accurate coverage assessments without the need for any dyes to be added to the sprayed solutions. In photo (i), the exposure is set too high, so that the image becomes saturated. In photo (ii), the exposure is brought lower, with no change in the range of intensities being displayed, so that darker regions corresponding to water droplets are visible. In photo (iii), the exposure is just starting to saturate, while there is a tighter display range, so that the water droplets are readily visible. In photo (iv), the exposure is brought lower, and there is a tight window of display range. In this image, not all the parts of the leaf are visible. In general, there is a balance of factors for setting imaging conditions, in order to achieve clear images of leaves or other parts of plants such that the region of interest and droplets may be clearly identified quantified.

Multiple Camera System Implementations

In certain embodiments, one or more cameras are used to obtain both pre-spray and post-spray images to calculate liquid coverage by comparing pixel histograms of the pre-spray and post-spray images. For example, in certain embodiments, a system for real-time detection of sprayed liquid coverage on plant surfaces is provided, wherein the system includes two (or more) cameras, and, optionally, a mirror, a light source (e.g., one or more light sources), a housing unit for the system, a cooling system for the cameras, a mechanism for vibration isolation/minimization, and a mechanism for adjustment of the cameras.

In certain embodiments, the system includes two cameras—for example, a red-green-blue (RGB) camera and a shortwave infrared (SWIR) camera—that are aligned to the same field of view and operate simultaneously. For example, where the system includes both an RGB camera and a SWIR camera, the RGB camera enables easy background removal to isolate plant surfaces in the images obtained by both the RGB and SWIR cameras, and the SWIR camera allows quantification of spray coverage in the obtained SWIR images without the need for the use of dye in the liquid to enhance detection. For example, the system may include optics that enable the two cameras to have the same field of view, such as a mirror, prism, cube, lens, and/or other optics. The mirror may be a SWIR hot mirror (e.g., reflecting IR light but allowing visible light to pass through), for example, such that the SWIR camera detects reflected IR light while the RGB camera detects visible light from the same field of view. The SWIR hot mirror enables both cameras to view the same region of interest, such that background removal performed from images obtained by one camera (e.g., the RGB camera) can be used to remove the background in the images obtained by the other camera (e.g., the SWIR camera), as well. Here, the background that is removed is the region of the image that does not correspond to plant surfaces. It is found background removal is easier to perform using RGB images, rather than SWIR, so the RGB camera performs background removal for both the RGB and SWIR images, and the thusly-background-removed SWIR images are analyzed for detection of liquid coverage, for example, by comparing pixel histograms of the pre-spray and post-spray SWIR images, as discussed in further detail herein. In certain embodiments, comparing the histograms of the pre-spray and post-spray images provides an efficient way to identify the number of pixels corresponding to the plant surfaces in the image that became wet (e.g., by determining histogram area corresponding to the pixels that became darker comparing the pre-spray image to the post-spray image). In certain embodiments, it is unnecessary to perform advanced image analysis (e.g., AI/machine learning methods), thereby enabling faster real-time image analysis.

In certain embodiments, instead of or in addition to optics that enable the two cameras to have the same field of view (e.g., a mirror, prism, cube, lens, and/or other optics), the system includes image alignment software that aligns the fields of view captured by the two cameras such that there is an overlapping field of view that is processed for determination of values of liquid coverage of the plant surfaces imaged.

In certain embodiments, the system comprises a light source. The light source may include, for example, a ring light. The light source (or one or more light sources) may provide SWIR light, RGB light, or a combination of SWIR and RGB light that allows for further enhancement of visual contrast between wet and non-wet surfaces in the images. In certain embodiments, no additional light source is needed (e.g., ambient light is sufficient).

Referring to the figures, FIG. 20 is a schematic diagram illustrating a liquid coverage measurement algorithm using pre-spray and post-spray cameras, according to an illustrative embodiment. For pre-spray imaging, multiple images (e.g., 5 images, 10 images, 20 images, etc.) are collected and cropped to easy-to-use sizes; the background is removed to see only the plant surfaces (e.g., the leaves); and the average histogram of plant surfaces (e.g., leaves) is calculated. For post-spray imaging, multiple images (e.g., 5 images, 10 images, 20 images, etc.) are collected and cropped to easy-use sizes; the background is removed to see only the plant surfaces (e.g., the leaves) and sprayed liquid on said plant surfaces; and the average histogram of leaves and liquid are calculated. The coverage is then calculated from both the pre-spray and post-spray average histograms, and the coverage is reported at a regular time intervals (e.g., every second, every 2 seconds, every 5 seconds, every 10 seconds, every 20 seconds, etc.) to a screen or display device. In certain embodiments, for example, a plow-mounted system, a running series of pre-spray and post-spray images are obtained and analyzed, such that liquid coverage is determined in real time as the system is moved.

Referring to the figures, FIG. 21 is a schematic diagram illustrating a liquid coverage model where pixel values post-spray and pre-spray are displayed as separate histograms, according to an illustrative embodiment. The histograms have pixel properties (e.g., pixel intensity, greyscale value, brightness, etc.) on the horizontal axis and total number of pixels on the vertical axis. The post-spray and pre-spray histogram distributions are shifted along the horizontal axis. In some embodiments, the pre-spray distribution may be centered at a higher quantity along the horizontal axis (e.g., pixel intensity) than the post-spray distribution, for example, where darker pixels correspond to wet surfaces. Comparisons of these two histograms may be computed to determine coverage levels of liquids sprayed on plant surfaces.

In some embodiments, the imaging system includes two cameras (e.g., where each camera obtains both pre-spray and post-spray images, or where at least one camera obtains both pre-spray and post-spray images), a mirror, a light source, a form of cooling for the cameras, vibration isolation, adjustable mounts for the cameras, and an external housing for the entire system. FIG. 22 is a schematic diagram illustrating a two-camera imaging system implementation, including two cameras (camera 900 and camera 902, e.g., an RGB camera and a SWIR camera), a mirror 904, and light source 906, according to an illustrative embodiment. By using two cameras, dyes are not needed in the liquids to create contrast between wet and non-wet areas in order to measure liquid spray coverage. This imaging system can be retrofitted onto agricultural spray systems.

Figure 22:
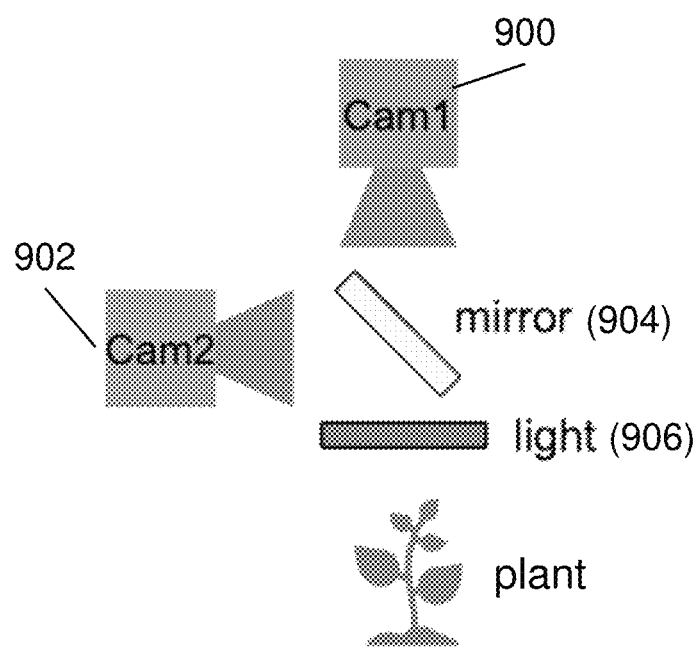

In some embodiments, a first camera is an RGB camera, which is well suited for background removal, and a second camera is a SWIR camera, which is well suited for imaging contrast between wet and non-wet areas so that spray coverage imaging can be done without using dyes in the spray liquid. In some embodiments, both cameras are RGB cameras. In some embodiments, both cameras are SWIR cameras. As shown in FIG. 22, the two cameras are positioned so that their optical axes are perpendicular to each other, with one camera pointing down toward plants on the ground.

As shown in FIG. 22, a light source is positioned so that it illuminates the plants on the ground below. In some embodiments, the light source may be a light-emitting diode (LED) emitting light at a visible wavelength. In some embodiments, the light source may be an LED emitting multiple visible wavelengths (e.g., a white LED, a broadband LED). In some embodiments, the light source may be a broadband visible light source (e.g., a white light source, an incandescent lamp, a halogen lamp, a gas discharge lamp, a fluorescent lamp, etc.). In some embodiments, the light source may be a laser light source. In some embodiments, the light source may be a short wave infrared (SWIR) light source. In some embodiments, more than one light source may be used at the same time, with each light source emitting light of the same or different wavelengths. In some embodiments, the light source may be a single point source. In some embodiments, the light source may be arranged as a ring light, where light is emitted by multiple sources arranged in a circle. In some embodiments, the light source may be a flat light source. In some embodiments, the light source may be a combination of a visible light source and a SWIR light source. The selection of light sources may be chosen to enhance contrast between wet and non-wet areas for different types of plants and surfaces and for different liquid sprays.

Referring still to FIG. 22, a mirror is positioned between the two cameras so that light from the plant and ground are split into the two cameras. By splitting the same incident light into the two cameras, both cameras are able to view the same region of interest so that software masks generated from background removal in one camera can be used to remove the background in the other camera. In some embodiments, background removal is conducted using an RGB camera. In some embodiments, the mirror is a beam splitter that splits the incident light equally into transmitted and reflected beams to be collected by the two cameras. In some embodiments, the mirror is a dichroic mirror. In some embodiments, the mirror is a hot mirror (e.g., a specialized dielectric mirror, e.g., comprising a dichroic filter) that reflects infrared (IR) light but allows visible light to pass through. The hot mirror may be made of borosilicate glass, for example.

Figure 23A:
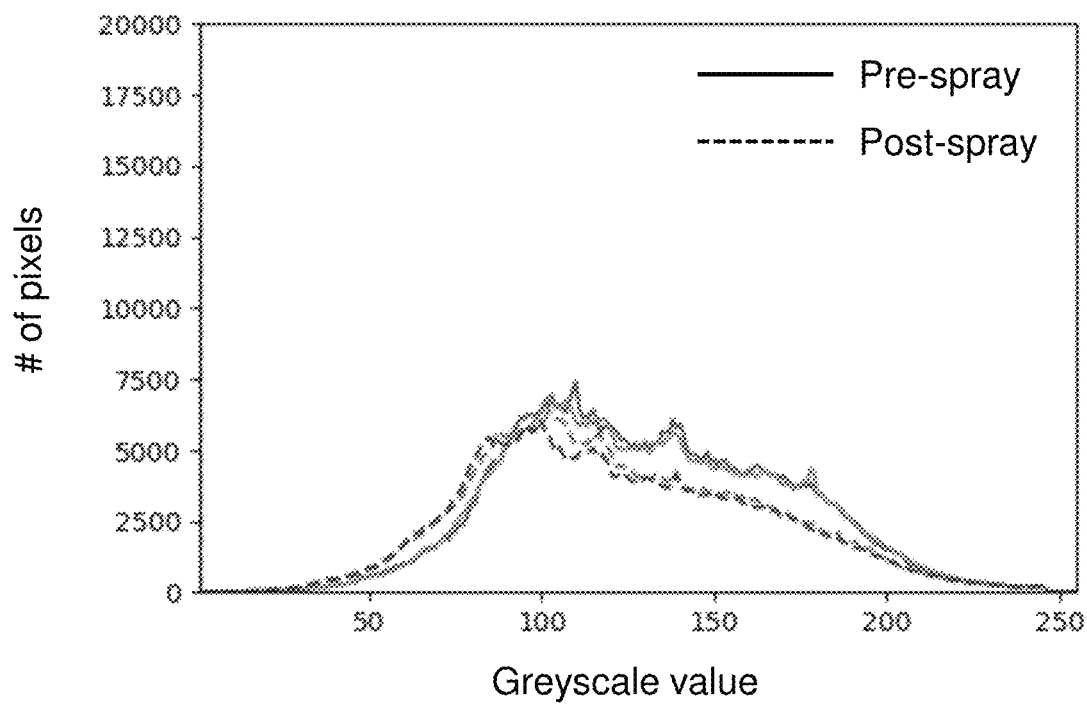
Figure 23B:
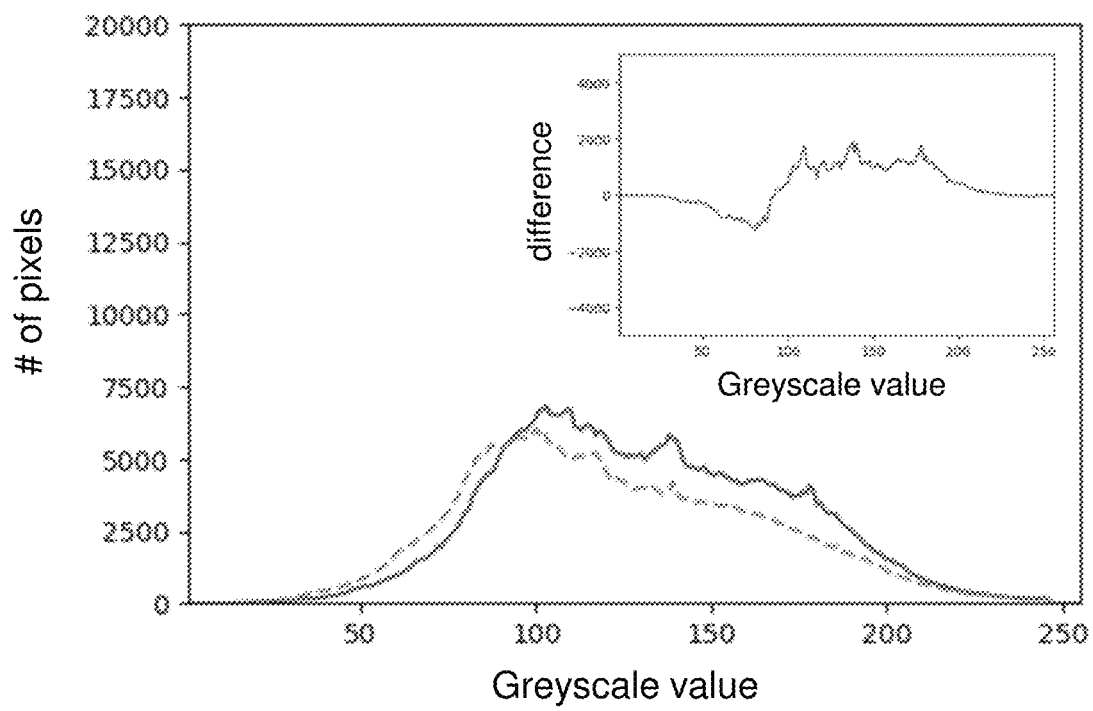

In some embodiments, one or more cameras of the imaging system are arranged to capture pre-spray images, while one or more other cameras of the imaging system are arranged to capture post-spray images. In some embodiments, at least one of the cameras of the imaging system is arranged to capture both the pre-spray images and the post-spray images. Comparing the background-eliminated (masked) pre-spray images with the background-eliminated post-spray images can allow liquid spray coverage to be calculated. Referring to the figures, FIG. 23A is a plot of pixel histograms from multiple pre-spray (solid lines) and post-spray (dashed lines) images, according to an illustrative embodiment, where all regions not corresponding to the plant surfaces have been removed/masked from the images. These pixel histograms are examples of data obtained from images taken during experimental demonstrations. The horizontal axis shows greyscale values ranging from 0 to 255, where 0 corresponds to black and 255 corresponds to white. The vertical axis shows total number of pixels. FIG. 23B is a plot of pixel histograms from an average of pre-spray data (solid line) and post-spray data (dashed line), while the inset is a plot of the difference between pre-spray and post-spray histograms, according to an illustrative embodiment. In the inset, regions of the curve that are negative correspond to pixels that have become darker after spraying, while regions of the curve that are positive correspond to pixels that have become lighter. Calculating the total area under the curve, e.g., by an integral, gives the total number of pixels that have changed. Then, the total number of darker pixels can be divided by the total number of initial leaf pixels (i.e., after background removal) to calculate the coverage. The calculations described here are simple enough to be carried out by a small onboard processor (e.g., an Arduino, a Raspberry Pi, etc.).

Figure 24:
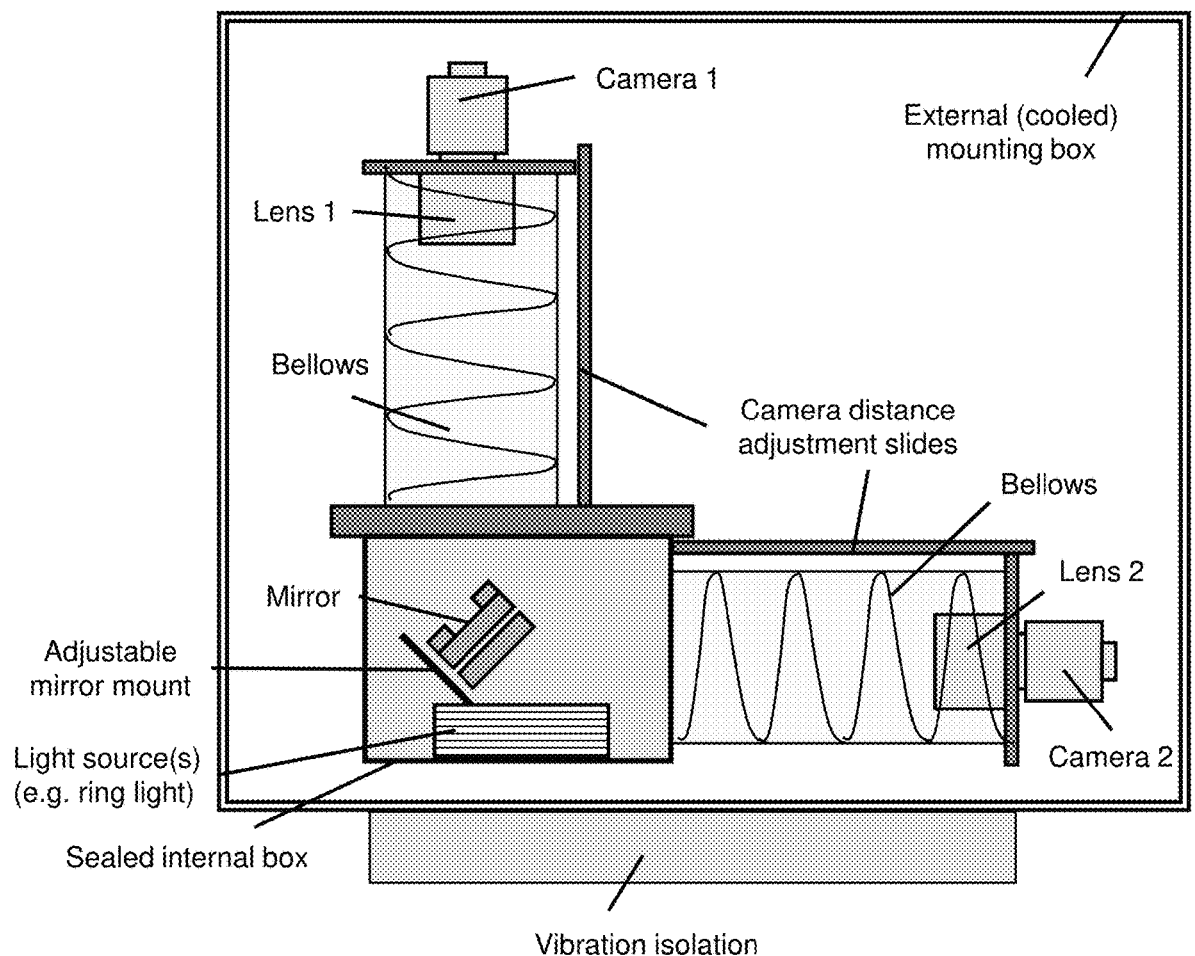

A further embodiment of a two-camera imaging system is shown in FIG. 24, which is a schematic diagram illustrating a two-camera imaging implementation, including a mirror, a light source, camera adjustment, external enclosure box, and cooling fan, according to an illustrative embodiment. Each camera is mounted on adjustment sliders so that their distances from the mirror can be adjusted. In some embodiments, the adjustment sliders are manually adjusted. In some embodiments the adjustment sliders are electronically controlled and actuated. In some embodiments, the adjustment slides can be locked or clamped in place so that the two cameras are rigidly mounted and fixed in position relative to each other. The camera mounting is surrounded by bellows for vibration control.

Referring still to FIG. 24, the mirror is mounted on an adjustable mirror mount. In some embodiments, the adjustable mirror mount allow the angle and position of the mirror to be adjusted along different axes. In some embodiments, the adjustable mirror mount is manually actuated. In some embodiments, the adjustable mirror mount is electronically controlled and actuated. In some embodiments, the position and tilt of the mirror mount can be locked in position. The mirror and light source are housed within a sealed internal box. The overall mounting system is such that the cameras and mirrors may be rigidly fixed in place with respect to each other for the most reliable imaging.

Referring still to FIG. 24, the entire imaging system may be housed within a mounting box with a cooling mechanism (e.g., cooling fan, thermoelectric coolers, water coolers, etc.) to provide cooling to the system. In some embodiments, the system may be mounted on a vibration isolation system (e.g., a gimbal system, springs, dampers, air isolators, elastic isolators, piezoelectric actuators, other passive isolation systems, an active isolation system, etc.).

What is claimed is:

1. A system for automatically quantifying liquid coverage on plant surfaces, the system comprising:
    a processor of a computing device; and
    a memory having instructions stored thereon, wherein the instructions, when executed by the processor, cause the processor to:

receive an image comprising a region of interest corresponding to one or more plant surfaces;
automatically identify one or more portions of the region of interest corresponding to liquid; and
automatically determine a liquid coverage value for the region of interest in the image, wherein the liquid coverage value quantifies an area of the plant surfaces depicted in the region of interest that is covered by liquid,
wherein the instructions, when executed by the processor, further cause the processor to automatically identify the liquid coverage value for the plant surfaces using (i) one or more pre-spray images corresponding to a field of view comprising the one or more plant surfaces prior to spraying with a liquid, and (ii) one or more post-spray images corresponding to the field of view comprising the one or more plant surfaces after spraying with the liquid.

2. The system of claim 1, wherein the liquid on the plant surfaces comprises a sprayed-on solution comprising one or more members selected from the group consisting of water, an adjuvant, an additive, a crop-compatible dye, an agrochemical solution, a liquid solution of a pesticide, a liquid solution of a fertilizer, and a foliar fertilizer.

3. The system of claim 1, further comprising one or more imaging devices and/or sensors for obtaining the image, wherein the one or more imaging devices and/or sensors comprises at least one member of the group consisting of a camera, a digital camera, a camera phone, a thermal imaging device, a night vision camera, a Light Detection and Ranging (LiDAR) device, an electronic image sensor, a charge-coupled device (CCD), an active-pixel sensor (CMOS sensor), a smart image sensor, an intelligent image sensor, and a short-wave infrared (SWIR) camera.

4. The system of claim 3, wherein the liquid on the plant surfaces comprises a sprayed-on liquid, wherein the one or more imaging devices and/or sensors comprises the short-wave infrared (SWIR) camera, and wherein sufficient detectable contrast is achieved for accurate liquid coverage value determination without the need for any dyes to be added to the sprayed-on liquid.

5. The system of claim 1, further comprising a first camera for receiving a first image corresponding to a field of view comprising the one or more plant surfaces and a second camera for receiving a second image corresponding to the field of view of the first image, wherein the instructions, when executed by the processor, cause the processor to automatically identify a background mask from the first image, said background mask corresponding to non-plant-surface portions of the first image, to apply the background mask to the second image, thereby eliminating non-plant surface portions from the second image, and to automatically identify the liquid coverage value for the plant surfaces depicted in the background-eliminated second image.

6. The system of claim 5, wherein the first camera is a red-green-blue (RGB) camera and the second camera is a shortwave infrared (SWIR) camera.

7. The system of claim 6, comprising an optical element that reflects infrared (IR) light and allows visible light to pass, said optical element positioned to allow alignment of fields of view of the first camera and the second camera.

8. The system of claim 1, wherein the instructions, when executed by the processor, cause the processor to automatically determine a series of liquid coverage values for regions in a sequence of images in real time, as the sequence of images is obtained.

9. The system of claim 1, the system further comprising:

a display comprising a display screen and a graphical user interface (GUI), wherein the instructions cause the processor to graphically render the liquid coverage value for viewing by a person via the display.

10. The system of claim 1, the system further comprising:

a remote communications module, wherein the instructions cause the processor to communicate the liquid coverage value to a remote computing device using the remote communications module.

11. The system of claim 1, wherein the instructions, when executed by the processor, cause the processor to use the determined liquid coverage value to automatically determine an adjustment of one or more sprayer system parameters to achieve a desired level of liquid coverage, wherein the one or more sprayer system parameters comprises at least one member selected from the group consisting of a sprayer speed, a nozzle type, a nozzle positioning and/or orientation, a number of nozzles used, a spray pressure, an adjuvant and/or additive rate, an overall flow rate, and a boom orientation and/or height.

12. The system of claim 11, wherein the system comprises one or more environmental sensors for capturing environmental data corresponding to one or more environmental conditions at a location and at a time the image(s) is/are obtained, and wherein the instructions, when executed by the processor, cause the processor to use the environmental data along with the determined liquid coverage value or values to automatically determine the adjustment of the one or more sprayer system parameters, wherein the one or more environmental sensors comprises one or more sensors selected from the group consisting of a temperature sensor, a humidity sensor, a pressure sensor, a wind sensor, a light sensor, an air quality sensor, a gas sensor, a rainfall sensor, a radiation sensor, and a soil sensor.

13. The system of claim 11, wherein the instructions, when executed by the processor, cause the processor to automatically determine a series of liquid coverage values for regions of interest in a sequence of images and use the automatically determined values to automatically determine the adjustment of the one or more sprayer system parameters to achieve the desired level of liquid coverage, wherein the instructions cause the processor to automatically implement the determined adjustment(s) in real time via a control system for controlling the one or more sprayer system parameters, thereby operating the sprayer system in real time to improve liquid coverage by accounting for one or more changing conditions.

14. The system of claim 1, wherein the instructions, when executed by the processor, cause the processor to automatically identify the liquid coverage value for the plant surfaces using histograms computed for the one or more pre-spray images and the one or more post-spray images.

15. A method for automatically quantifying liquid coverage on plant surfaces, the method comprising:

receiving, by a processor of a computing device, an image comprising a region of interest corresponding to one or more plant surfaces;

automatically identifying, by the processor, one or more portions of the region of interest corresponding to liquid; and automatically determining, by the processor, a liquid coverage value for the region of interest in the image, wherein the liquid coverage value quantifies an area of the plant surfaces depicted in the region of interest that is covered by liquid, wherein the method further comprises:
obtaining from a first camera a first image corresponding to a field of view comprising the one or more plant surfaces;
obtaining from a second camera a second image corresponding to the field of view of the first image;
automatically identifying, by the processor, a background mask from the first image, said background mask corresponding to non-plant-surface portions of the first image;
applying the background mask to the second image, thereby eliminating non-plant surface portions from the second image; and
automatically identifying, by the processor, the liquid coverage value for the plant surfaces depicted in the background-eliminated second image.

16. The method of claim 15, wherein the liquid on the plant surfaces comprises a sprayed-on solution comprising one or more members selected from the group consisting of water, an adjuvant, an additive, a crop-compatible dye, an agrochemical solution, a liquid solution of a pesticide, a liquid solution of a fertilizer, and a foliar fertilizer.

17. The method of claim 15, further comprising obtaining the image using one or more imaging devices and/or sensors, wherein the one or more imaging devices and/or sensors comprises at least one member of the group consisting of a camera, a digital camera, a camera phone, a thermal imaging device, a night vision camera, a Light Detection and Ranging (LiDAR) device, an electronic image sensor, a charge-coupled device (CCD), an active-pixel sensor (CMOS sensor), a smart image sensor, an intelligent image sensor, and a short-wave infrared (SWIR) camera.

18. The method of claim 17, wherein the liquid on the plant surfaces comprises a sprayed-on liquid, wherein the one or more imaging devices and/or sensors comprises the short-wave infrared (SWIR) camera, and wherein sufficient detectable contrast is achieved for accurate liquid coverage value determination without the need for any dyes to be added to the sprayed-on liquid.

19. The method of claim 15, wherein the first camera is a red-green-blue (RGB) camera and the second camera is a shortwave infrared (SWIR) camera.

20. The method of claim 19, wherein obtaining the first and second images comprises using an optical element that reflects infrared (IR) light and allows visible light to pass, said optical element positioned to allow alignment of fields of view of the first camera and the second camera.

21. The method of claim 15, comprising automatically determining, by the processor, a series of liquid coverage values for regions in a sequence of images in real-time, as the sequence of images is obtained.

22. The method of claim 15, further comprising graphically rendering the liquid coverage value on a display for viewing by a person.

23. The method of claim 15, further comprising communicating, by the processor, the liquid coverage value to a remote computing device.

24. The method of claim 15, comprising automatically determining, by the processor, an adjustment of one or more sprayer system parameters to achieve a desired level of liquid coverage, using the determined liquid coverage value, wherein the one or more sprayer system parameters comprises at least one member selected from the group consisting of a sprayer speed, a nozzle type, a nozzle positioning and/or orientation, a number of nozzles used, a spray pressure, an adjuvant and/or additive rate, an overall flow rate, and a boom orientation.

25. The method of claim 24, wherein the method comprises capturing environmental data corresponding to one or more environmental conditions at a location and at a time the image(s) is/are obtained using one or more environmental sensors, and automatically determining, by the processor, the adjustment of the one or more sprayer system parameters using the environmental data along with the determined liquid coverage value or values, wherein the one or more environmental sensors comprise one or more sensors selected from the group consisting of a temperature sensor, a humidity sensor, a pressure sensor, a wind sensor, a light sensor, an air quality sensor, a gas sensor, a rainfall sensor, a radiation sensor, and a soil sensor.

26. The method of claim 24, comprising automatically determining, by the processor, a series of liquid coverage values for regions of interest in a sequence of images and using the automatically determined liquid coverage values to automatically determine the adjustment of the one or more sprayer system parameters to achieve the desired level of liquid coverage, and automatically implementing the determined adjustment(s) in real time via a control system for controlling the one or more sprayer system parameters, thereby operating the sprayer system in real time to improve liquid coverage by accounting for one or more changing conditions.

27. The method of claim 15, comprising automatically identifying, by the processor, the liquid coverage value for the plant surfaces using (i) one or more pre-spray images corresponding to the field of view comprising the one or more plant surfaces prior to spraying with a liquid, and (ii) one or more post-spray images corresponding to the field of view comprising the one or more plant surfaces after spraying with the liquid.

28. The method of claim 27, comprising automatically identifying, by the processor, the liquid coverage value for the plant surfaces using histograms computed for the one or more pre-spray images and the one or more post-spray images.

29. A system for automatically quantifying liquid coverage on plant surfaces, the system comprising:
a processor of a computing device; and
a memory having instructions stored thereon, wherein the instructions, when executed by the processor, cause the processor to:
receive an image comprising a region of interest corresponding to one or more plant surfaces;
automatically identify one or more portions of the region of interest corresponding to liquid; and
automatically determine a liquid coverage value for the region of interest in the image, wherein the liquid coverage value quantifies an area of the plant surfaces depicted in the region of interest that is covered by liquid,
wherein the system further comprises a first camera for receiving a first image corresponding to a field of view comprising the one or more plant surfaces and a second camera for receiving a second image corresponding to the field of view of the first image, wherein the instructions, when executed by the processor, cause the processor to automatically identify a background mask from the first image, said background mask corresponding to non-plant-surface portions of the first image, to apply the background mask to the second image, thereby eliminating non-plant surface portions from the second image, and to automatically identify the liquid coverage value for the plant surfaces depicted in the background-eliminated second image.

30. The system of claim 1, wherein the instructions, when executed by the processor, cause the processor to use the determined liquid coverage value to automatically determine an adjustment of a spray solution composition to achieve a desired level of liquid coverage.

* * * * *